United States Patent
Killen et al.

(10) Patent No.: US 8,202,498 B2
(45) Date of Patent: Jun. 19, 2012

(54) MULTIPHASE CONTACT AND DISTRIBUTION APPARATUS FOR HYDROPROCESSING

(75) Inventors: Ralph E. Killen, San Francisco, CA (US); Craig Boyak, El Cerrito, CA (US); Steven X. Song, Albany, CA (US); Abdenour Kemoun, Pleasant Hill, CA (US); Steve Souers, Ocean Springs, MS (US); Krishniah Parimi, Alamo, CA (US); Zackory Akin, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 203 days.

(21) Appl. No.: 12/839,227

(22) Filed: Jul. 19, 2010

(65) Prior Publication Data

US 2012/0014847 A1 Jan. 19, 2012

(51) Int. Cl.
*B01J 8/00* (2006.01)
*B01J 8/02* (2006.01)
(52) U.S. Cl. .......... 422/607; 422/606; 422/220
(58) Field of Classification Search .......... 422/220, 422/606, 607
See application file for complete search history.

(56) References Cited

U.S. PATENT DOCUMENTS

| | | | |
|---|---|---|---|
| 5,158,714 A | 10/1992 | Shih et al. | |
| 5,232,283 A | 8/1993 | Goebel et al. | |
| 5,389,343 A | 2/1995 | Gentry | |
| 5,462,719 A | 10/1995 | Pedersen et al. | |
| 5,554,346 A | 9/1996 | Perry et al. | |
| 5,635,145 A | 6/1997 | Den Hartog et al. | |
| 5,688,445 A | 11/1997 | Wrisberg | |
| 5,756,055 A | 5/1998 | Kelly et al. | |
| 5,799,877 A | 9/1998 | Gupta et al. | |
| 5,837,208 A | 11/1998 | Grott et al. | |
| 5,904,907 A | 5/1999 | Shih | |
| 5,935,413 A | 8/1999 | Boyd et al. | |
| 5,942,162 A | 8/1999 | Gamborg et al. | |
| 5,942,197 A | 8/1999 | Gupta et al. | |
| 5,989,502 A | 11/1999 | Nelson et al. | |
| 6,180,068 B1 | 1/2001 | Boyd et al. | |
| 6,183,702 B1 | 2/2001 | Nguyen et al. | |
| 6,338,828 B1 | 1/2002 | Stupin et al. | |
| 6,508,459 B1 | 1/2003 | Jacobs et al. | |
| 6,669,915 B1 | 12/2003 | Boyd et al. | |
| 6,769,672 B2 | 8/2004 | Muller | |
| 6,881,387 B1 | 4/2005 | Jacobs et al. | |
| 6,984,365 B2 | 1/2006 | Nelson et al. | |
| 7,044,159 B2 | 5/2006 | Jacobs et al. | |

(Continued)

OTHER PUBLICATIONS

PCT/US2011/033281, International Search Report, mailing date Dec. 27, 2011, pp. 1-9.

*Primary Examiner* — Walter D Griffin
*Assistant Examiner* — Lessanework Seifu
(74) *Attorney, Agent, or Firm* — David Robeson; Michael D. Ross

(57) ABSTRACT

Systems and apparatus for mixing, cooling, and distributing multiphase fluid mixtures within a reactor, wherein reactor internal apparatus of the present invention provides not only improved fluid mixing and distribution to each underlying catalyst bed surface, but also offers other advantages including: decreased mixing tray height; easier maintenance, assembly and disassembly; and decreased amounts of fabrication material. In an embodiment, fluid may be evenly distributed to a catalyst bed from a fluid distribution unit comprising a nozzle tray including a plurality of nozzles, wherein the nozzles include at least one liquid inlet disposed tangentially to an inner surface of the nozzle.

20 Claims, 17 Drawing Sheets

U.S. PATENT DOCUMENTS

| | | |
|---|---|---|
| 7,045,103 B2 | 5/2006 | McDougald et al. |
| 7,052,654 B2 | 5/2006 | McDougald et al. |
| 7,074,372 B2 | 7/2006 | Muldowney et al. |
| 7,112,312 B2 | 9/2006 | Chou |
| 7,125,006 B2 | 10/2006 | Jacobs et al. |
| 7,459,132 B2 | 12/2008 | Prince et al. |
| 7,473,405 B2 | 1/2009 | Kemoun et al. |
| 7,506,861 B2 | 3/2009 | Muller |
| 7,600,742 B2 | 10/2009 | Breivik |
| 2002/0127160 A1 | 9/2002 | Harter et al. |
| 2002/0175427 A1 | 11/2002 | Jacobs et al. |
| 2003/0146525 A1 | 8/2003 | Jacobs et al. |
| 2004/0018128 A1 | 1/2004 | Gupta |
| 2004/0028579 A1 | 2/2004 | Van Der Meer et al. |
| 2004/0134836 A1 | 7/2004 | Muller |
| 2004/0228779 A1 | 11/2004 | McDougald et al. |
| 2004/0234434 A1 | 11/2004 | Muldowney et al. |
| 2005/0077635 A1 | 4/2005 | Van Hasselt et al. |
| 2005/0082696 A1 | 4/2005 | Jacobs et al. |
| 2005/0163682 A1 | 7/2005 | Jacobs et al. |
| 2006/0078483 A1 | 4/2006 | Kemoun et al. |
| 2006/0257300 A1 | 11/2006 | Breivik et al. |
| 2007/0025495 A1 | 2/2007 | Sevenhuijsen |
| 2007/0145610 A1 | 6/2007 | Breivik |
| 2007/0241467 A1 | 10/2007 | Sevenhuijsen et al. |
| 2007/0248510 A1 | 10/2007 | Dean et al. |
| 2007/0272298 A1 | 11/2007 | Porscha |
| 2009/0047194 A1 | 2/2009 | Nascimento et al. |
| 2009/0134063 A1 | 5/2009 | Huziwara et al. |
| 2009/0174091 A1 | 7/2009 | Jarlkov |
| 2009/0321966 A1 | 12/2009 | Sechrist |
| 2009/0324464 A1 | 12/2009 | Sechrist |

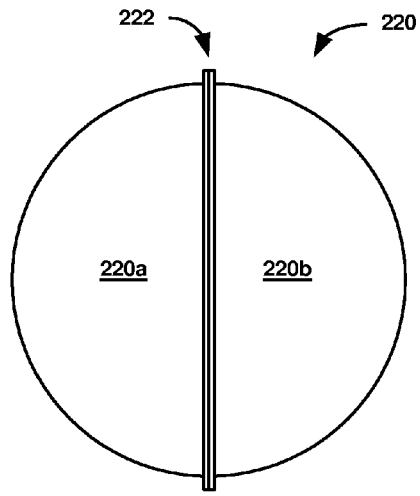 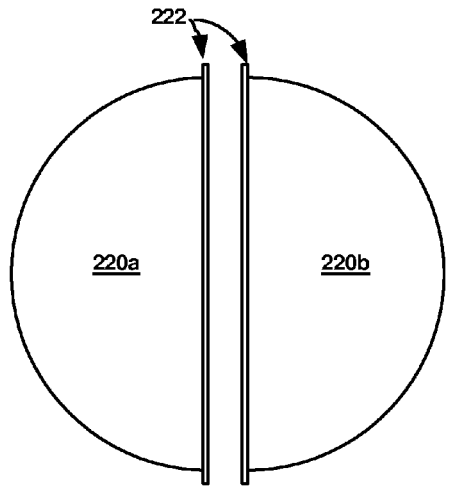
FIG. 7A        FIG. 7B
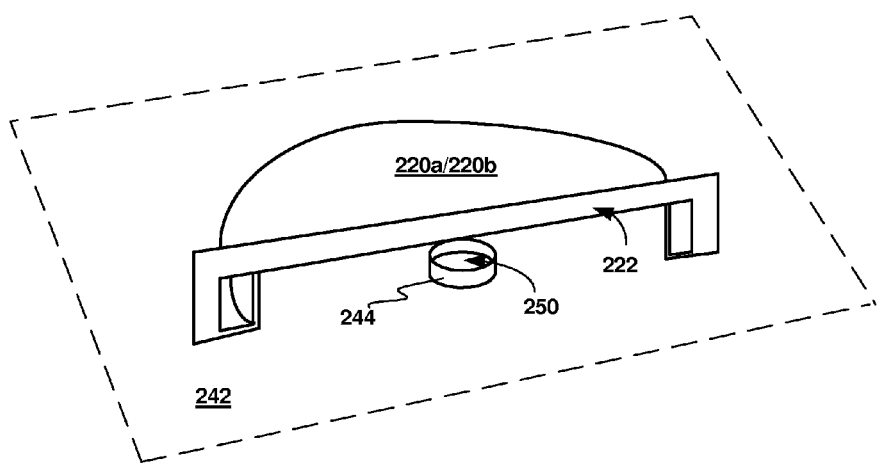
FIG. 7C

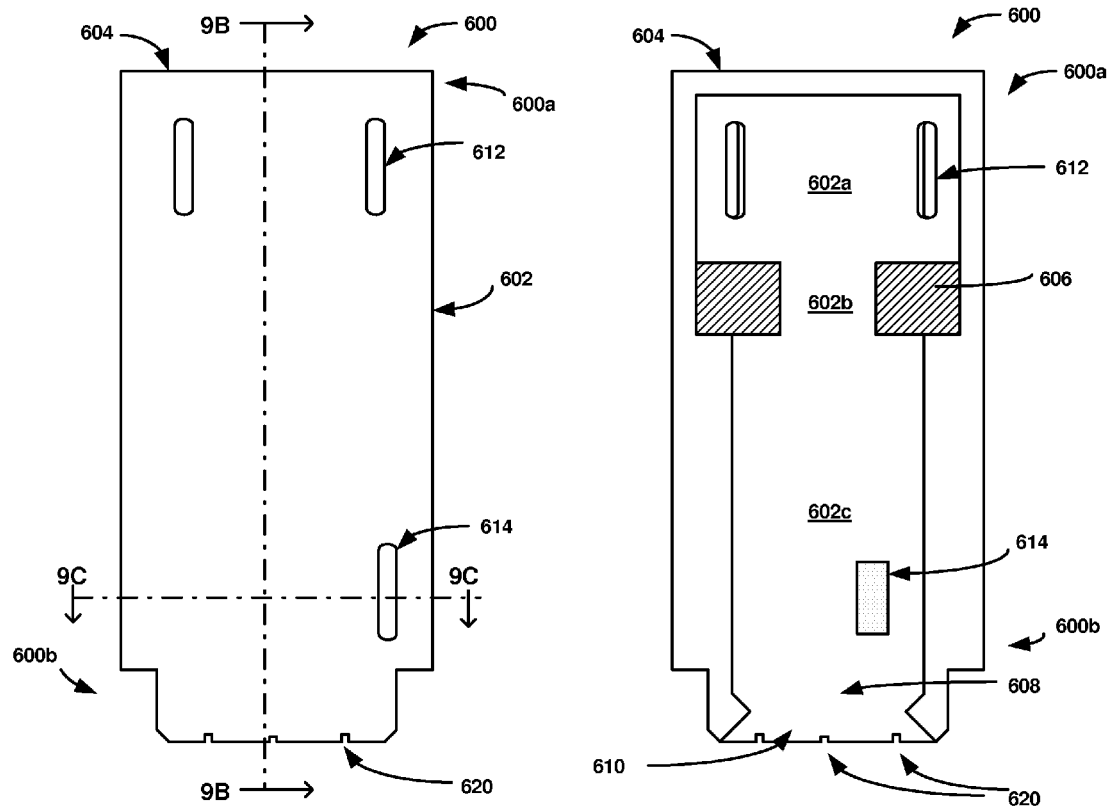
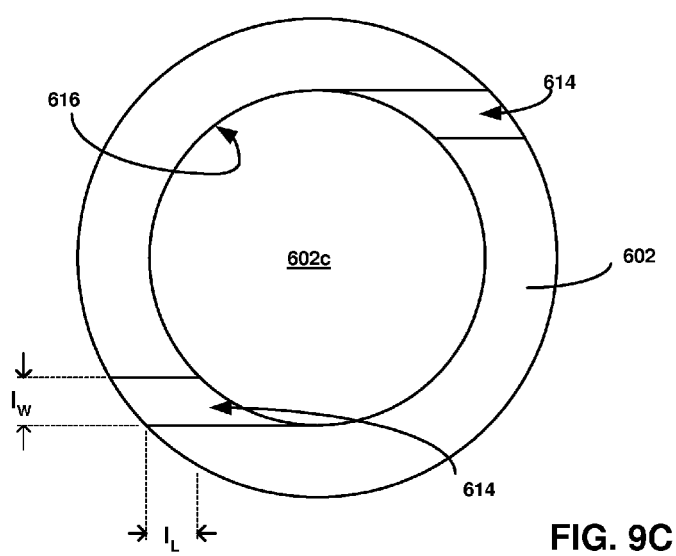

MULTIPHASE CONTACT AND DISTRIBUTION APPARATUS FOR HYDROPROCESSING

FIELD OF THE INVENTION

This invention relates to systems and apparatus for multiphase fluid contact and distribution.

BACKGROUND OF THE INVENTION

Many catalytic processes are performed in reactors containing a series of separate catalytic beds. Reactors used in the chemical, petroleum refining, and other industries for passing liquids or mixed-phase liquid/gas mixtures over packed beds of particulate solids are employed for a variety of different processes. Examples of such processes include: catalytic dewaxing, hydrotreating, hydrodesulphurization, hydrofinishing, and hydrocracking. In these processes a liquid phase is typically mixed with a gas or vapor phase and the mixture passed over a particulate catalyst in a packed bed within a downflow reactor.

In downflow reactors, it is necessary that the gas and liquid are properly mixed and uniformly distributed across the horizontal cross section of the reactor prior to contacting each catalyst bed. Such uniform distribution of the gas and liquid provides major advantages, including: efficient utilization of catalyst, reduced catalyst top layer attrition, improved yields, improved product quality, and increased run lengths. Generally in a downflow catalytic reactor, a plurality of catalyst beds are arranged within the reactor, and a distributor system for the efficient mixing of gas and liquids is disposed above each catalyst bed. The region between catalyst beds is normally provided with a gas injection line to provide additional gas to compensate for gas consumed in the previous catalyst bed. The injected gas can also act as a quench gas for cooling the feed exiting a catalyst bed prior to the feed entering the next catalyst bed. Generally, the injected gas is hydrogen or comprises hydrogen. The liquid feed falling from the abovelying catalyst bed is allowed to accumulate on a collection tray. The quench gas and liquid then pass into a mixing chamber where a swirling movement of the liquid is provided. This enables good mixing of the liquid and thereby provides even temperature conditions of the liquid. Gas-liquid mixing also takes place inside the mixing chamber.

The fluid from the mixing chamber flows downward onto a deflector or impingement plate, whereby the flow is redirected onto a distributor tray having a large number of downflow openings for the passage of liquid. For cross-sectional liquid flow distribution, the downflow openings of conventional apparatus can comprise one or more conduits, or chimneys. The chimney is a cylindrical structure with an open top and one or more openings in the upper portion of its height through which a gas phase can enter. The gas phase travels downward through the length of the chimney. The lower portion of the chimney can have one or more lateral openings for liquid flow through which a liquid phase can enter the chimney and contact the gas phase. As liquid continues to accumulate on the distributor tray, the liquid will rise to a level that covers the lateral opening(s) in the chimney so that the passage of gas is precluded and so that the liquid can enter through the lateral opening(s) into the chimney. Gases and liquids egress via an opening in the bottom of the chimney, through the distributor tray, and onto an underlying catalyst bed. A disadvantage of conventional conduits or chimneys is that, due to the low turbulence around liquid streams, only limited mixing between the two phases will occur.

A good flow distribution device for a catalytic reactor should meet the following four basic requirements: provide even distribution of feed to a catalyst bed over a range of gas and liquid feed rates; be tolerant to certain out-of-levelness of the distribution tray; provide good gas-liquid mixing and heat exchange, and require minimum catalyst bed height to fully wet the underlying catalyst bed. Because conventional chimneys rely on the static liquid height on the tray as the driving force for liquid flow into the chimney, they are deficient in meeting these criteria due to poor tolerance for deviations from levelness of the distributor tray, as well as exhibiting suboptimal spray discharge of fluids onto the underlying catalyst bed, and other deficiencies.

One of the key considerations in flow distributor design is the discharge pattern of liquid and gas from the device. A conventional chimney distributor provides a limited number of points of contact of the liquid feed with the catalyst bed. As a result, a larger distance from the chimney to the bed is required to wet the catalyst surface.

U.S. Pat. No. 7,473,405 to Kemoun et al. discloses a nozzle device for coupling with a fluid distribution conduit.

There is a continuing need for hydroprocessing reactor apparatus providing improved hydrogen/oil mixing at the mixing tray, more uniform and consistent liquid distribution on the catalyst bed, a decreased mixing tray height, and decreased amounts of fabrication material, as well as easier maintenance, assembly and disassembly. There is also a need for systems and apparatus that provide improved tolerance for distributor tray out-of-levelness conditions. There is still a further need for fluid distribution apparatus that can provide more uniform distribution of liquid on a catalyst bed under liquid-only conditions.

SUMMARY OF THE INVENTION

According to one aspect of the present invention there is provided a reactor system comprising a reactor shell, a primary feed distribution unit disposed within the reactor shell, and at least one secondary feed distribution unit disposed beneath the primary feed distribution unit within the reactor shell. The primary feed distribution unit comprises a primary deflector plate and a first nozzle tray disposed beneath the deflector plate. The at least one secondary feed distribution unit comprises a collection tray and a second nozzle tray disposed beneath the collection tray. Each of the first nozzle tray and the second nozzle tray comprises a plurality of nozzles, the nozzles each comprise a nozzle body including a distal body portion having at least one liquid inlet configured for the passage of liquid therethrough. The distal body portion defines a substantially cylindrical distal void. Each liquid inlet is disposed tangentially to an inner surface of the distal body portion.

In an embodiment, the present invention also provides a reactor system comprising a reactor shell having an inner wall, a primary feed distribution unit disposed within the reactor shell, and at least one secondary feed distribution unit disposed beneath the primary feed distribution unit within the reactor shell. Each secondary feed distribution unit comprises a collection tray, a nozzle tray disposed beneath the collection tray, at least one support ring affixed to the reactor shell inner wall, and a plurality of trusses. Each truss spans the at least one support ring. Each truss has an upper flange and a lower flange, the upper flange supports the collection tray and the lower flange supports the nozzle tray.

In another embodiment of the present invention, there is provided a feed distribution unit for a catalytic reactor, the feed distribution unit comprising a deflector plate and a nozzle tray disposed beneath the deflector plate. The nozzle tray includes a plurality of nozzles. Each nozzle comprises a nozzle body including a distal body portion having at least one liquid inlet configured for the passage of liquid therethrough. The distal body portion defines a substantially cylindrical distal void. Each liquid inlet is disposed tangentially to an inner surface of the distal body portion.

In an embodiment, the present invention further provides a nozzle for the even distribution of a multi-phase fluid mixture, the nozzle comprising a nozzle body having a proximal body portion, an intermediate body portion, and a distal body portion. The proximal body portion defines a substantially cylindrical proximal void, and the proximal body portion has at least one gas inlet configured for the passage of gas therethrough into the proximal body portion. The intermediate body portion defines a substantially cylindrical intermediate void in fluid communication with the proximal void. The distal body portion has a body wall and at least one liquid inlet configured for the passage of liquid therethrough into the distal body portion. The distal body portion defines a substantially cylindrical distal void, and the at least one liquid inlet is disposed tangentially to an inner surface of the distal body portion.

In another embodiment of the present invention, there is provided a fluid distribution apparatus for a reactor, the apparatus comprising a nozzle tray; a plurality of chimneys affixed to, and extending through, the nozzle tray; and a fluid distribution nozzle disposed within each chimney. Each chimney has a chimney wall defining a substantially cylindrical void extending substantially vertically from a lower surface of the nozzle tray to a location above an upper surface of the nozzle tray. The chimney has an open proximal end and an open distal end, and the chimney wall has at least one lateral opening therein. The nozzle comprises a nozzle body comprising a proximal body portion, an intermediate body portion, and a distal body portion having a distal body wall. The proximal body portion defines a substantially cylindrical proximal void, and the open proximal end is configured for the passage of gas therethrough. The intermediate body portion defines a substantially cylindrical intermediate void in fluid communication with the proximal void. The distal body portion has a liquid inlet configured for the passage of liquid therethrough into the distal body portion. The distal body portion defines a substantially cylindrical distal void. The liquid inlet comprises a curved channel within the distal body wall, and the curved channel has an inner terminus disposed tangentially to an inner surface of the distal body portion.

In another embodiment, the present invention still further provides a fluid distribution device comprising a substantially cylindrical hollow nozzle body having a plurality of outer slots disposed circumferentially around the nozzle body; a cap affixed to a proximal portion of the nozzle body, the cap having an axial proximal opening therein; a base affixed to a distal portion of the nozzle body, the base having an axial distal opening therein; and a substantially cylindrical inner conduit disposed axially within a proximal portion of the nozzle body. The inner conduit is disposed within the proximal opening of the cap, and the inner conduit extends proximally from the cap to define a proximal end of the inner conduit. The inner conduit has a plurality of inner slots disposed circumferentially around the proximal end of the inner conduit. A distal end of the inner conduit extends distally to a location proximal to a distal end of each of the outer slots.

BRIEF DESCRIPTION OF THE DRAWINGS

FIG. 7A is a schematic plan view of a mixing box, and FIG. 7B is a schematic plan view of the separated halves of the mixing box of FIG. 7A, according to another embodiment of the present invention;

FIG. 7C is a perspective view of one half of a mixing box disposed on a collection tray segment of a secondary feed distribution unit, according to another embodiment of the present invention;

FIG. 9A shows a fluid distribution nozzle as seen from the side, according to an embodiment of the present invention; FIG. 9B is a longitudinal sectional view of the nozzle as seen along the lines 9B-9B of FIG. 9A; and FIG. 9C shows liquid inlets in the nozzle along the lines 9C-9C of FIG. 9A;

Figure 11A:
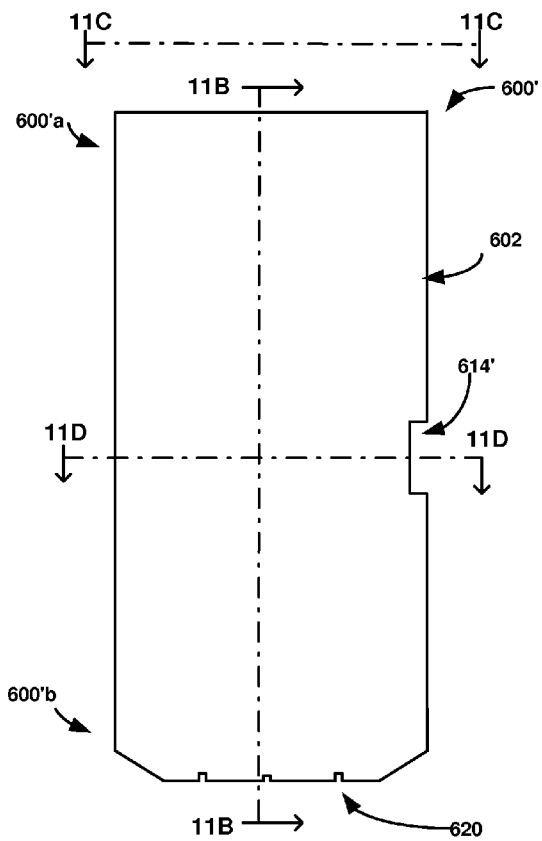
FIG. 11A shows a fluid distribution nozzle as seen from the side.
Figure 13:
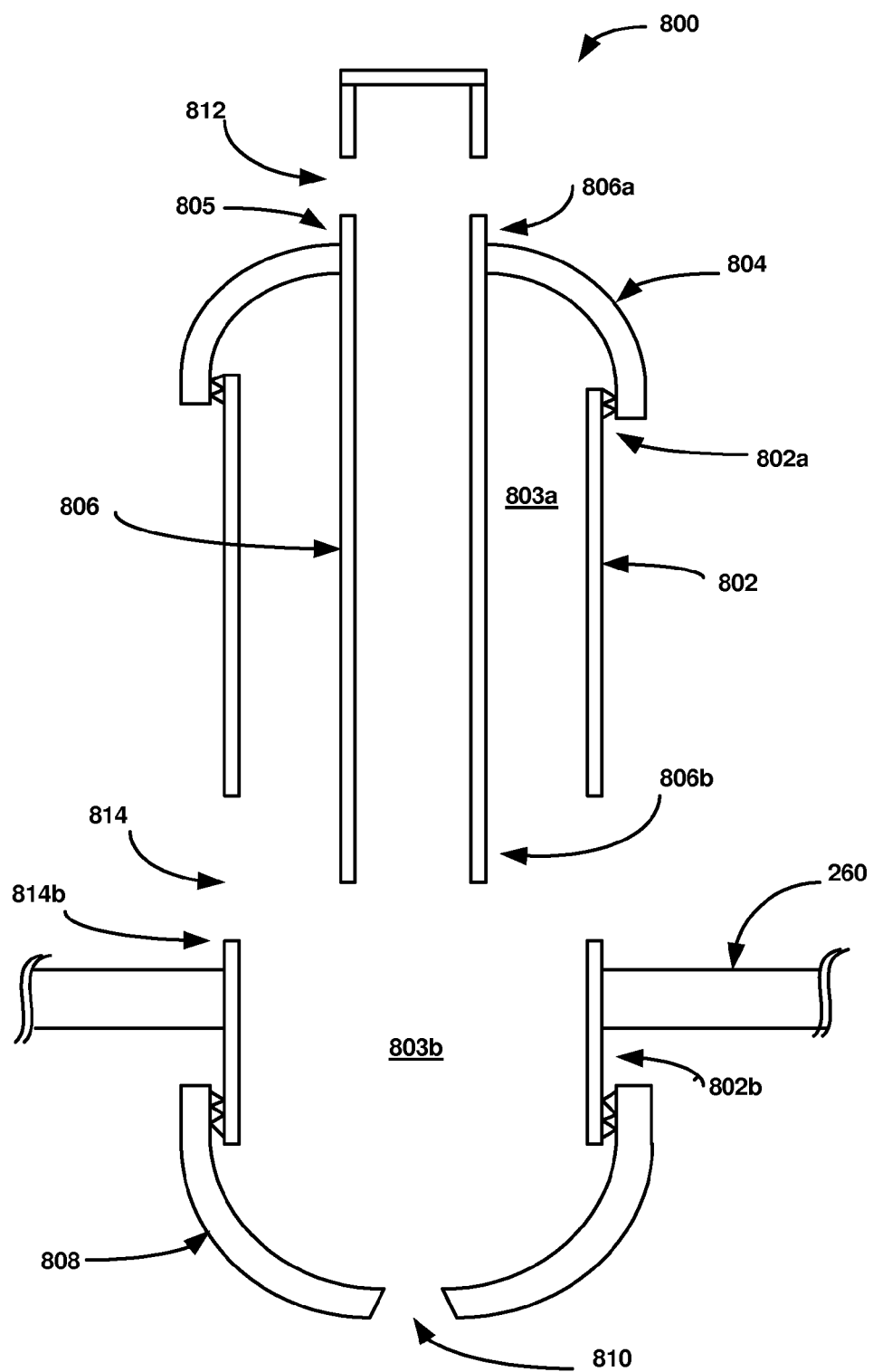
Figure 14A:
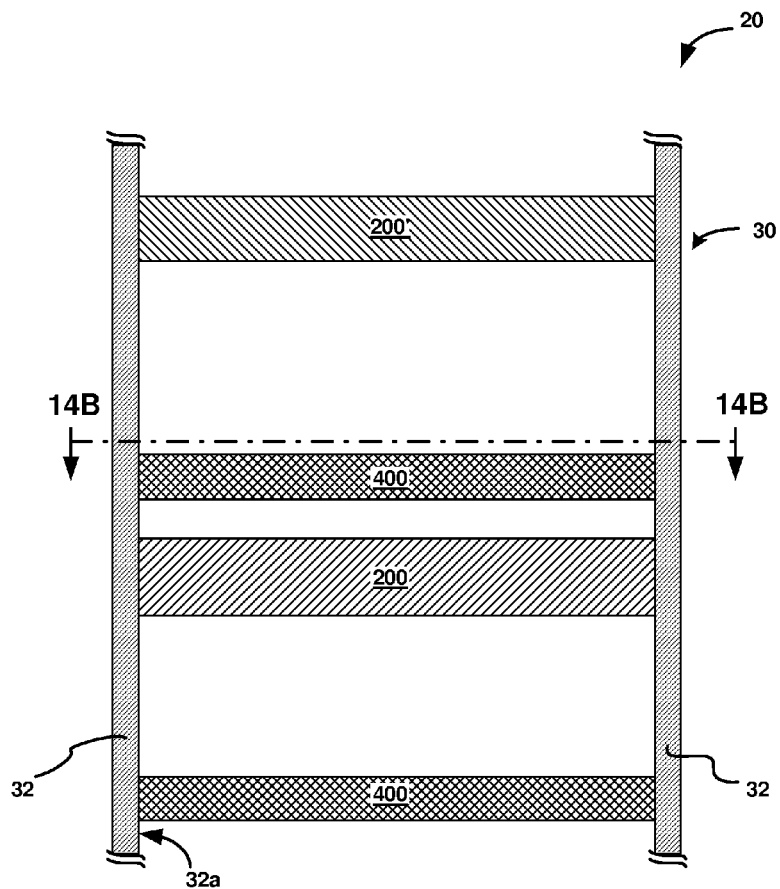
Figure 14E:
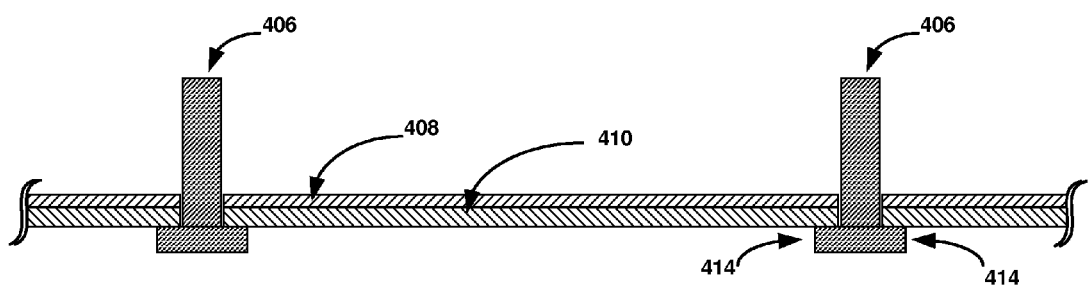
Figure 14B:
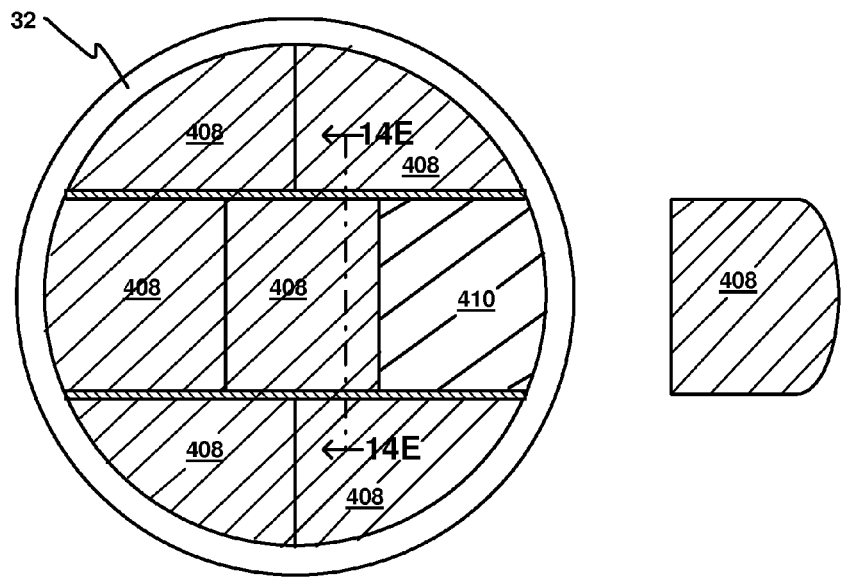
Figure 14C:
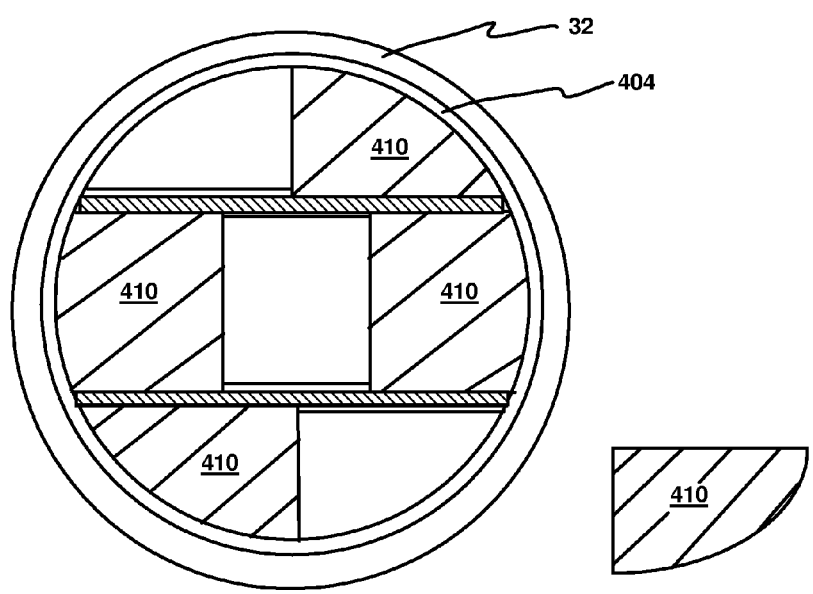
Figure 14D:
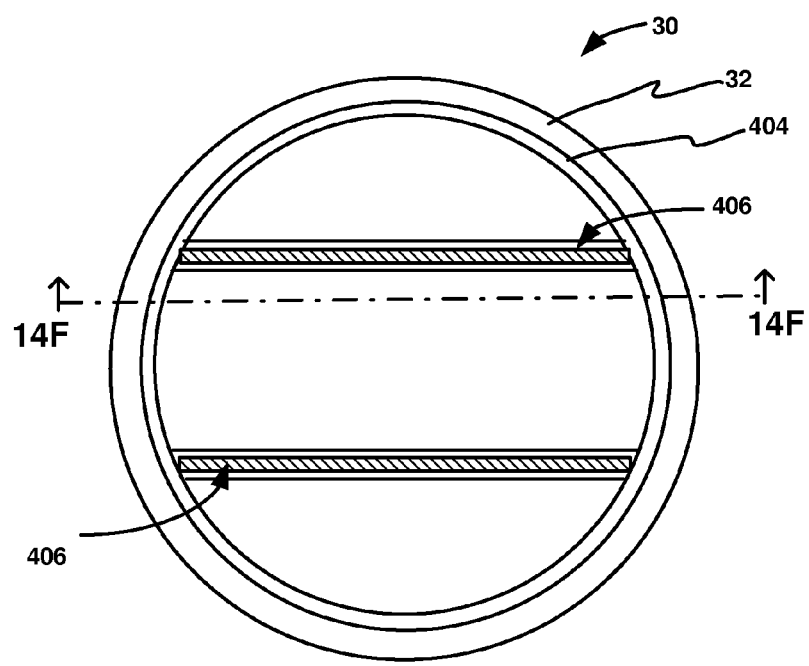
Figure 14F:
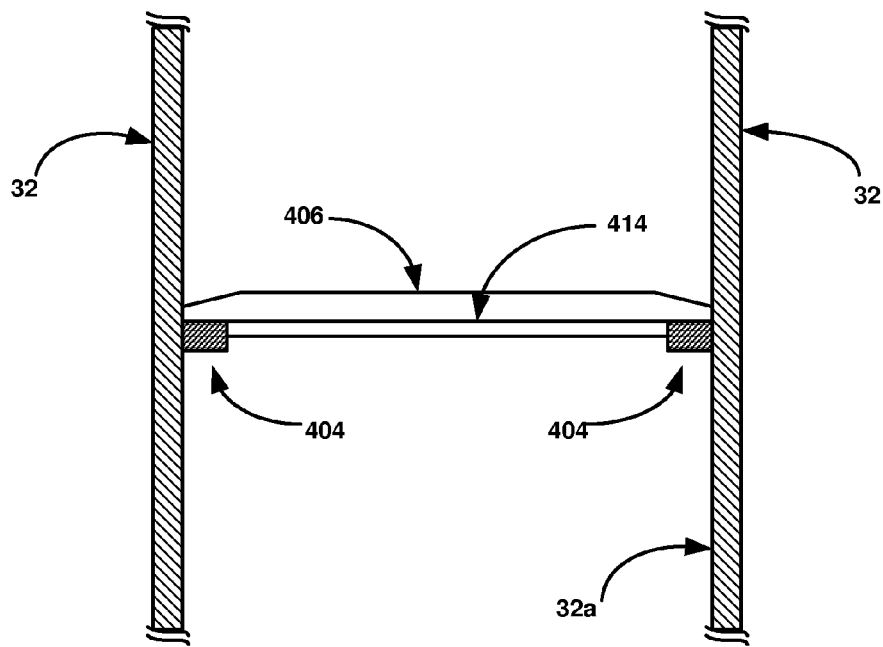

12A showing the nozzle of FIG. 11A inserted therein, according to another embodiment of the present invention;

FIG. 13 is a schematic longitudinal sectional view of a fluid distribution nozzle, according to another embodiment of the present invention;

FIG. 14A is a schematic cut-away side view of a portion of a reactor shell showing a catalyst support unit in relation to a feed distribution unit; FIG. 14B is a plan view of the catalyst support unit as seen along the lines 14B-14B of FIG. 14A and showing a plurality of screen panels; FIG. 14C is a plan view of the catalyst support unit of FIG. 14B with the screen panels removed and showing a plurality of grid panels; FIG. 14D is a plan view of a portion of the catalyst support unit of FIG. 14B with the screen panels and grid panels removed and showing a plurality of catalyst support beams; FIG. 14E is a sectional view showing the catalyst support beams, grid panels and screen panels, as seen along the lines 14E-14E of FIG. 14B; and FIG. 14F is a sectional view showing the catalyst support beams in relation to the reactor shell and shell ledge, as seen along the lines 14F-14F of FIG. 14D, according to the present invention.

DETAILED DESCRIPTION OF THE INVENTION

The present invention provides reactor internal apparatus for the even distribution of fluids for downflow multi-bed catalytic reactors. Such reactors may be used in the chemical and petroleum refining industries for effecting various reactions such as catalytic dewaxing, hydrotreating, hydrofinishing and hydrocracking. The present invention is particularly useful for effecting mixed-phase reactions between a liquid, such as a liquid hydrocarbon feed and a gas, such as hydrogen gas. More particularly, the invention relates to systems and apparatus for improving the mixing and distribution of gas and liquid phases above a bed of solid catalyst, while at the same time minimizing the height of the reactor internals. The instant invention is particularly useful for catalytic reactors in which gas-liquid mixtures are passed through a plurality of beds of solid catalyst particles in a broad range of processes, particularly for downflow catalytic reactors used for hydrotreating and hydrocracking in oil refining operations.

Unless otherwise specified, the recitation of a genus of elements, materials, or other components from which an individual or combination of components or structures can be selected is intended to include all possible sub-generic combinations of the listed components and mixtures thereof. Also, "include" and its variants are intended to be non-limiting, such that recitation of items in a list is not to the exclusion of other like items that may also be useful in the materials, elements, structures, compositions, and methods of this invention.

Figure 1:
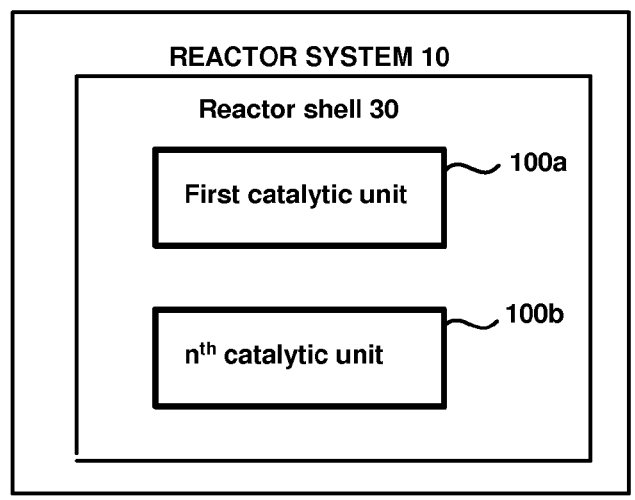
FIG. 1 is a block diagram schematically representing a reactor system, according to an embodiment of the present invention.

With reference to the drawings, FIG. 1 is a block diagram schematically representing a reactor system 10, according to an embodiment of the present invention. Reactor system 10 may comprise a reactor shell 30 having reactor shell walls which may be at least substantially vertical. Reactor shell 30 may house at least one catalytic unit 100 (see, e.g., FIG. 2). In an embodiment, reactor system 10 may comprise a plurality of catalytic units, as represented in FIG. 1 as a first ($1^{st}$) catalytic unit 100a and an $n^{th}$ catalytic unit 100n. The number of catalytic units 100 within reactor shell 30 may typically be in the range from one (1) to about eight (8), e.g., n may be in the range from about two (2) to eight (8).

Figure 2:
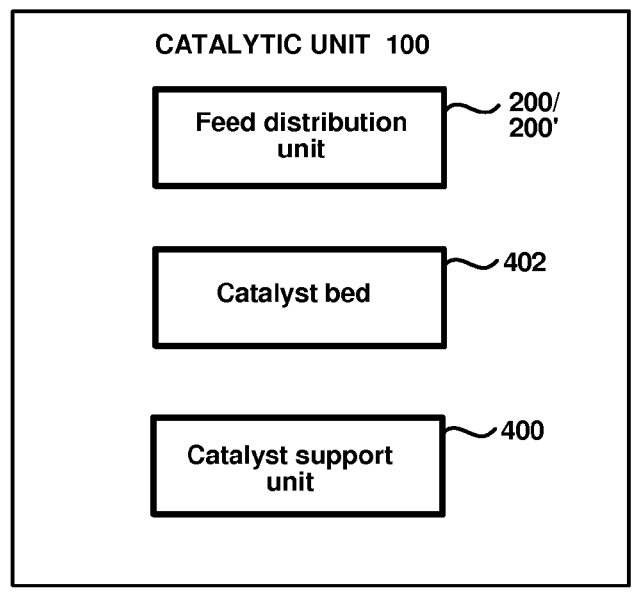
FIG. 2 is a block diagram schematically representing a catalytic unit for a reactor system, according to an embodiment of the present invention.

FIG. 2 is a block diagram schematically representing a catalytic unit 100 for a reactor system 10, according to the present invention. In an embodiment, catalytic unit 100 may comprise a feed distribution unit 200/200', a catalyst support unit 400, and a catalyst bed 402. The feed distribution unit may be a primary feed distribution unit 200' (see, e.g., FIG. 4A) or a secondary feed distribution unit 200 (see, e.g., FIG. 4B). In an embodiment, feed distribution unit 200/200' may be disposed above an associated catalyst bed 402, and catalyst bed 402 may be supported on or by catalyst support unit 400. In an embodiment, catalyst bed 402 may comprise a layer of solid catalyst.

Figure 3:
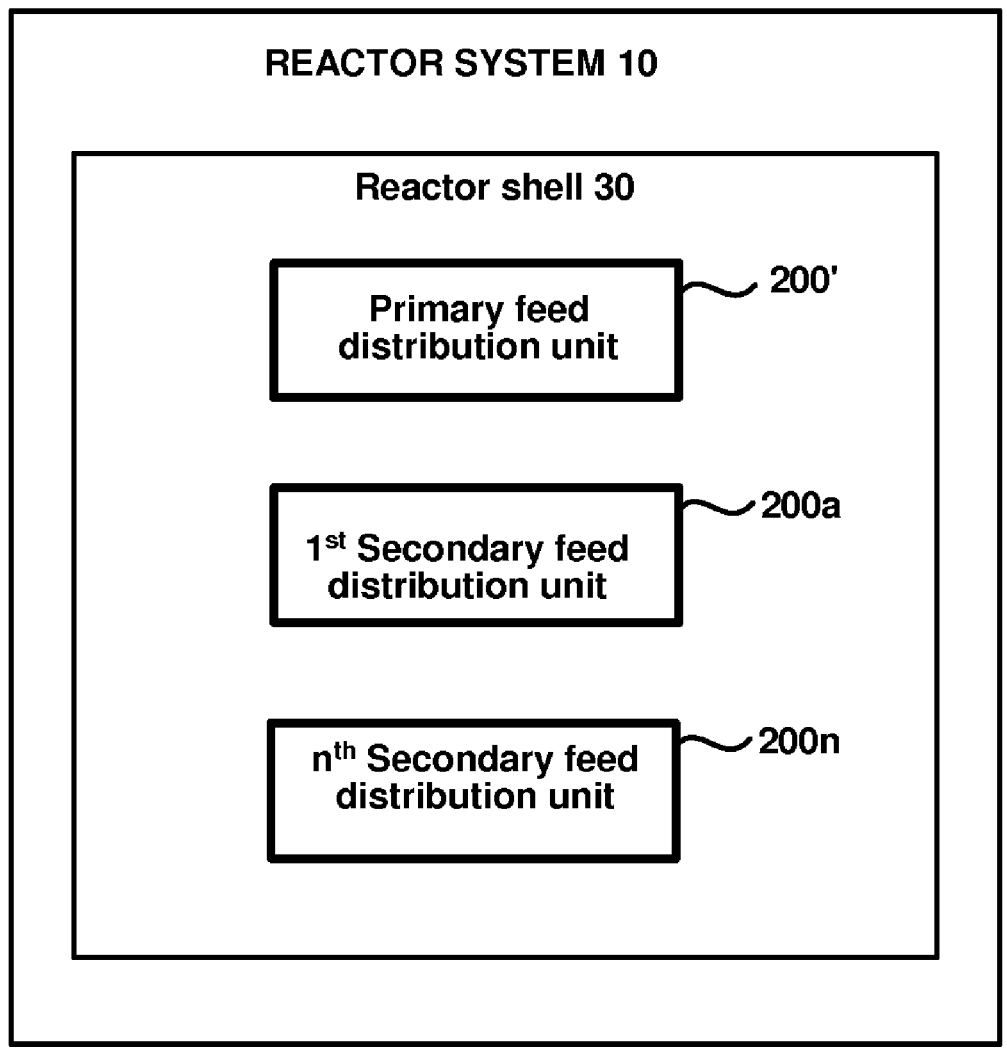
FIG. 3 is a block diagram schematically representing a reactor system, according to another embodiment of the present invention.

FIG. 3 is a block diagram schematically representing a reactor system 10, according to another embodiment of the present invention. Reactor system 10 may comprise a primary feed distribution unit 200' and at least one secondary feed distribution unit 200. In the embodiment of FIG. 3, reactor system 10 may comprise a first secondary feed distribution unit 200a and an $n^{th}$ feed distribution unit 200n. The number of secondary feed distribution units 200 within reactor shell 30 may typically be in the range from one (1) to about eight (8). The total number of primary and secondary feed distribution units 200'/200 within reactor shell 30 may correspond to the number of catalytic units 100 within reactor shell 30.

Figure 4A:
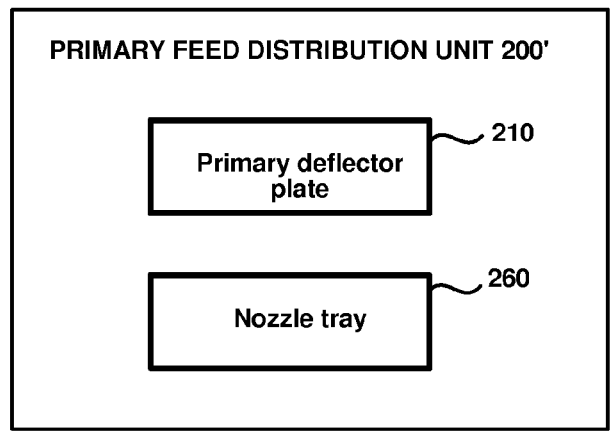
FIG. 4A is a block diagram schematically representing a primary feed distribution unit, according to an embodiment of the present invention.

FIG. 4A is a block diagram schematically representing a primary feed distribution unit 200', according to an embodiment of the present invention. Primary feed distribution unit 200' may comprise a primary deflector plate 210 and a nozzle tray 260. Primary deflector plate 210 may be disposed above nozzle tray 260. Primary deflector plate 210 may have a plurality of perforations therein (see, for example, FIG. 6A). Primary deflector plate 210 may be configured for allowing the passage of fluid through primary deflector plate 210 to nozzle tray 260. Nozzle tray 260 may include a plurality of fluid distribution nozzles 600 (see, for example, FIG. 8). In an embodiment, primary deflector plate 210 may be supported on fluid distribution nozzles 600.

Figure 4B:
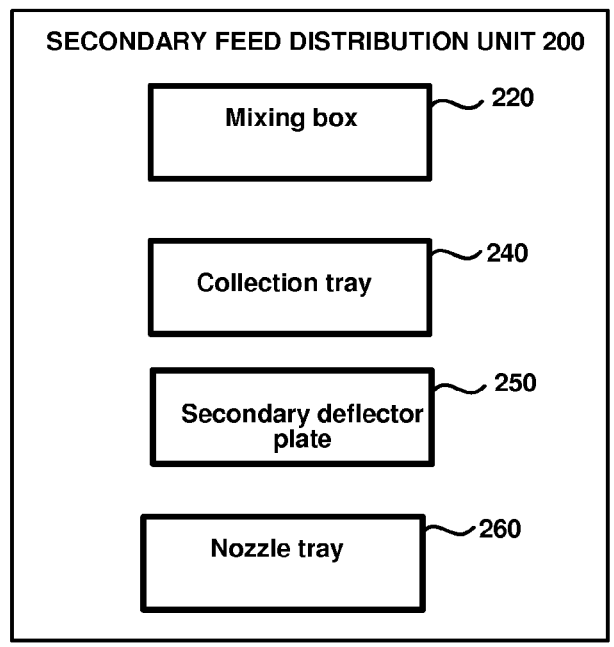
FIG. 4B is a block diagram schematically representing a secondary feed distribution unit, according to an embodiment of the present invention.

FIG. 4B is a block diagram schematically representing a secondary feed distribution unit 200, according to an embodiment of the present invention. Secondary feed distribution unit 200 may comprise a mixing box 220, a collection tray 240, a secondary deflector plate 250 and a nozzle tray 260. Mixing box 220 may be disposed on collection tray 240. Secondary deflector plate 250 may be disposed beneath collection tray 240 and above nozzle tray 260. Secondary deflector plate 250 may include a first peripheral portion and a second peripheral portion each having a plurality of perforations therethrough (see, for example, FIG. 6B). Secondary deflector plate 250 may further include a central entire portion lacking perforations therein (see, for example, FIGS. 6B and 6D). Nozzle tray 260 may include a plurality of fluid distribution nozzles (see, for example, FIG. 8). In an embodiment, secondary deflector plate 250 may be supported on fluid distribution nozzles 600.

Figure 5A:
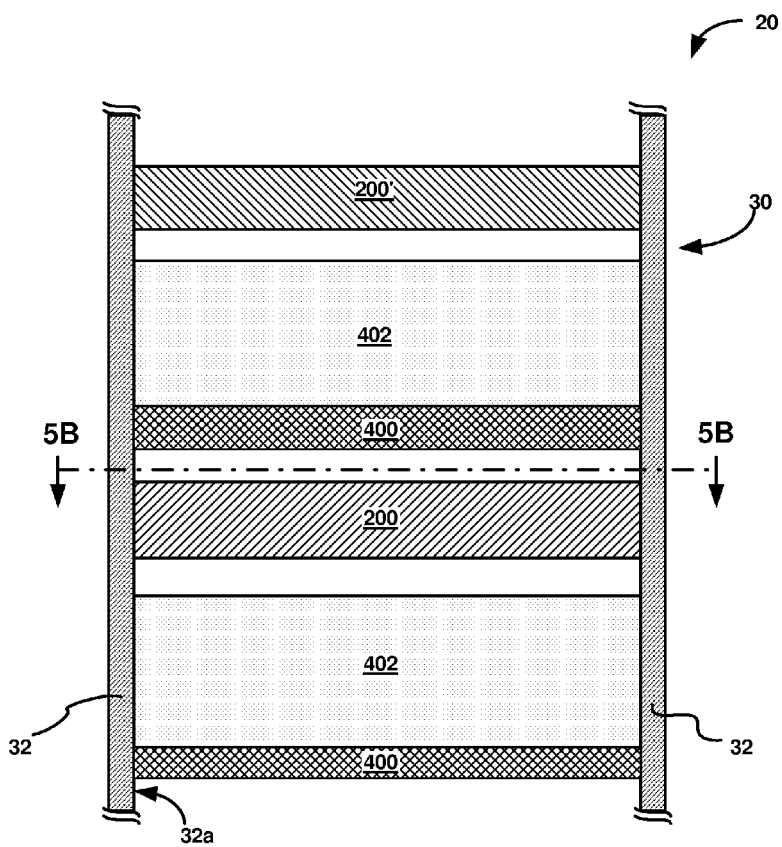
FIG. 5A shows a schematic cut-away view of a portion of a reactor shell with associated reactor internal apparatus, according to an embodiment of the present invention.

FIG. 5A shows a schematic cut-away view of a portion of a reactor 20 including a reactor shell 30 having shell walls 32, according to an embodiment of the present invention. Reactor shell 30 may house a primary feed distribution unit 200' and at least one secondary feed distribution unit 200. A catalyst bed 402 may be disposed beneath each of primary feed distribution unit 200' and secondary feed distribution unit(s) 200. Each catalyst bed 402 may be disposed on a catalyst support unit 400 (see, for example, FIGS. 14A-F). Each of primary feed distribution unit 200', secondary feed distribution unit(s) 200, and catalyst support unit 400 may be supported by the walls 32 of reactor shell 30. The shell walls 32 at the location of primary feed distribution unit 200', secondary feed distribution unit(s) 200, and catalyst support unit(s) 400 may be at least substantially vertical. Each of primary feed distribution unit 200', secondary feed distribution unit(s)

200, and catalyst support units 400 may be disposed at least substantially orthogonal to shell walls 32.

Figure 5D:
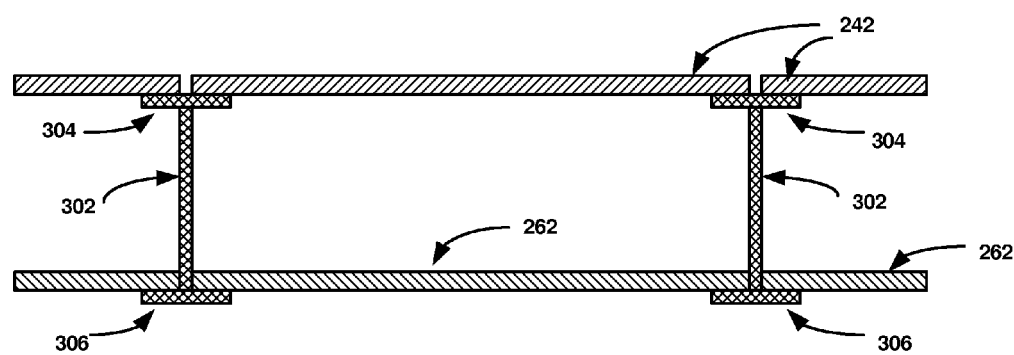
FIG. 5D is a sectional view of a portion of the feed distribution unit of FIG. 5B as seen along the lines 5D-5D of FIG. 5B.
Figure 5B:
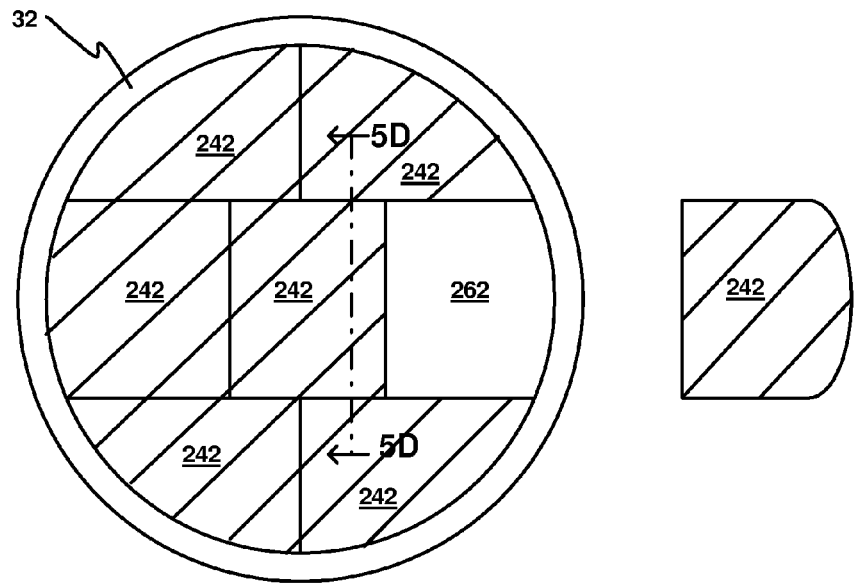
FIG. 5B is a plan view of a feed distribution unit as seen along the lines 5B-5B of FIG. 5A and showing a plurality of collection tray segments.

FIG. 5B is a plan view of a secondary feed distribution unit 200, as seen along the lines 5B-5B of FIG. 5A. Secondary feed distribution unit 200 may include a plurality of collection tray segments 242. Collection tray segments 242 jointly define collection tray 240 (see, for example, FIG. 6C). Collection tray segments 242 may be reversibly affixed to each other to allow for the convenient assembly and disassembly of collection tray 240. In an embodiment, collection tray segments 242 may be affixed to each other via a plurality of pins, such as wedge pins (not shown). One collection tray segment 242 is shown in FIG. 5B as being removed to reveal a nozzle tray segment 262 (see, for example, FIG. 5C). It is to be understood that secondary feed distribution unit 200 is not limited to the configuration of collection tray segments 242 as shown in FIG. 5B, but rather other numbers and configurations of collection tray segments 242 are also within the scope of the present invention.

Figure 5C:
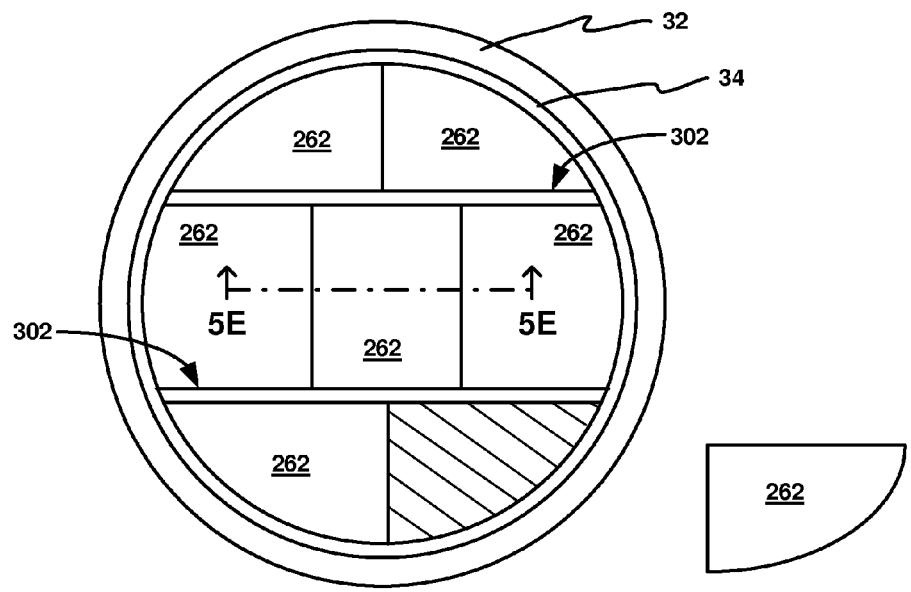
FIG. 5C is a plan view of a portion of the feed distribution unit of FIG. 5B with the collection tray segments removed and showing a plurality of nozzle tray segments.

FIG. 5C is a plan view of a portion of the secondary feed distribution unit 200 of FIG. 5B with collection tray segments 242 removed. Secondary feed distribution unit 200 further comprises a plurality of nozzle tray segments 262. Nozzle tray segments 262 jointly define nozzle tray 260 (see, for example, FIGS. 8 and 10). In FIG. 5C, one of the nozzle tray segments 242 is shown as being displaced. Each of collection tray segments 242 and nozzle tray segments 262 may be supported by a plurality of trusses 302 (see, for example, FIG. 5D). Trusses 302 may in turn be supported by a support ring 34. Support ring 34 may be affixed to an inner surface 32a of shell wall 32. In an embodiment, support ring 34 may comprise a plurality of brackets (not shown) configured for the attachment of trusses 302. Each truss may span reactor shell 30. Although two (2) trusses 302 are shown in FIG. 5C, other numbers of trusses 302 are also within the scope of the present invention. Typically, the number of trusses 302 spanning reactor shell 32 may be in the range from one (1) to about six (6).

With further reference to FIG. 5C, support ring 34 may be affixed, e.g., welded, to the inner surface 32a of reactor shell wall 32, and support ring 34 may be disposed circumferentially thereon. In an embodiment, support ring 34 may comprise a metal skirt (not shown) having an upper shelf and a lower shelf, the upper and lower shelves configured for supporting collection tray 240 and nozzle tray 260, respectively. In another embodiment, support ring 34 may comprise an upper ring and a lower ring coaxial with, and vertically spaced from, the upper ring (neither of the upper ring nor the lower ring are shown); wherein each of the upper ring and the lower ring may be affixed (e.g., welded) to the inner surface 32a of reactor shell wall 32.

With still further reference to FIG. 5C, nozzle tray segments 262 may be reversibly affixed to each other to allow for the convenient assembly and disassembly of nozzle tray 260. In an embodiment, nozzle tray segments 262 may be affixed to each other via a plurality of pins, such as wedge pins (not shown). It is to be understood that secondary feed distribution unit 200 is not limited to the configuration of nozzle tray segments 262 as shown in FIG. 5C, but rather other numbers and configurations of nozzle tray segments 262 are also within the scope of the present invention.

FIG. 5D is a sectional view of a portion of secondary feed distribution unit 200 of FIG. 5B, as seen along the lines 5D-5D of FIG. 5B, showing a pair of spaced apart trusses 302. Each truss 302 may comprise an upper flange 304 and a lower flange 306. A plurality of collection tray segments 242 may be disposed on, and supported by, upper flange 304. A plurality of nozzle tray segments 262 may be disposed on, and supported by, lower flange 306.

Figure 5E:
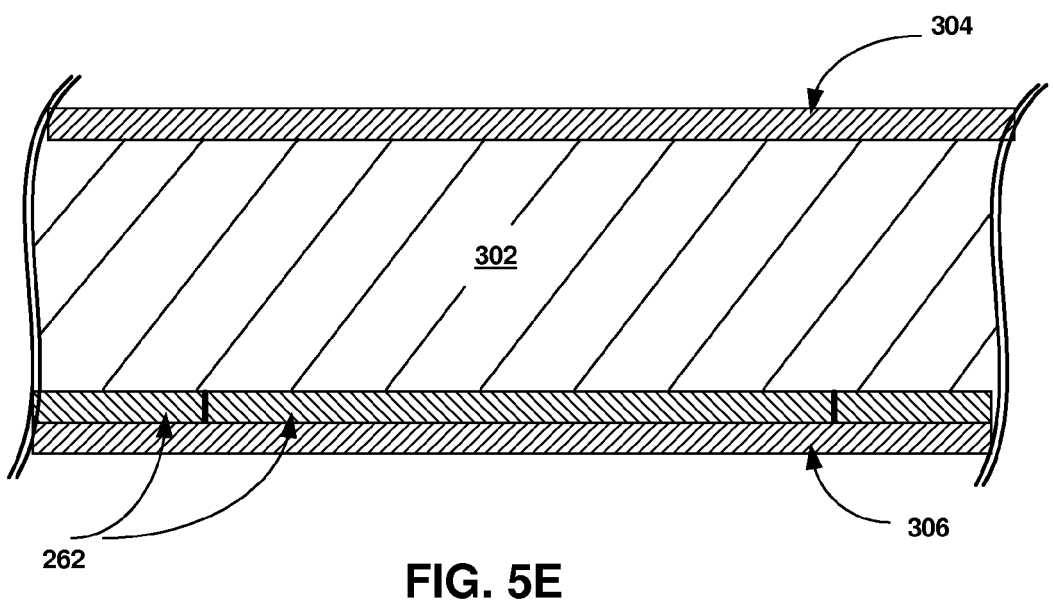
FIG. 5E is a side view of a truss bearing a plurality of nozzle tray segments, as seen along the lines 5E-5E of FIG. 5C.

FIG. 5E is a side view of a truss 302 bearing a plurality of nozzle tray segments 262 on truss lower flange 306, as seen along the lines 5E-5E of FIG. 5C. In an embodiment, truss 302 may be supported at each end by a bracket (not shown) attached to support ring 34. In FIG. 5E, collection tray segments 242 are shown as being removed from truss 302.

Figure 6A:
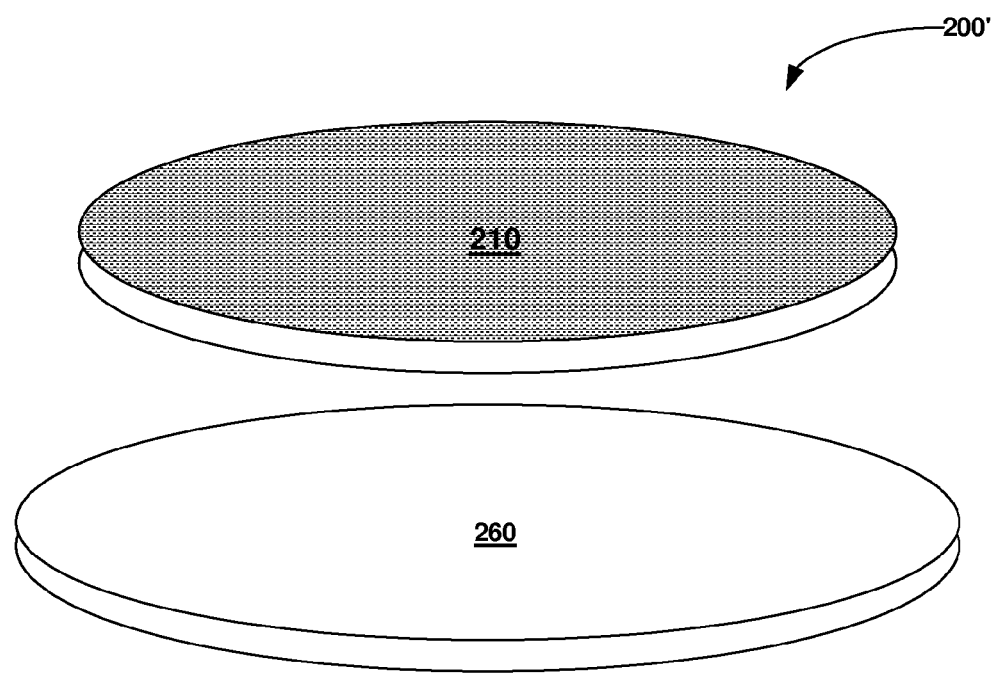
FIG. 6A is a perspective view of a primary feed distribution unit showing a primary deflector plate in relation to a nozzle tray, according to an embodiment of the present invention.

FIG. 6A is a perspective view of a primary deflector plate 210 in relation to a nozzle tray 260 of a primary feed distribution unit 200', according to an embodiment of the present invention. In an embodiment, primary deflector plate 210 may be at least substantially circular. Primary deflector plate 210 may typically have an area in the range from about 70% to 100% of the cross-sectional area of reactor shell 30, and often from about 90% to 100% of the cross-sectional area of reactor shell 30. Typically, nozzle tray 260 may have an area in the range from about 95% to 100% of the cross-sectional area of reactor shell 30. Nozzles 600 (see, e.g., FIGS. 9A-C) are omitted from FIG. 6A for the sake of clarity of illustration. Both nozzle tray 260 and primary deflector plate 210 may be disposed at least substantially orthogonal to reactor shell wall 32.

Figure 6B:
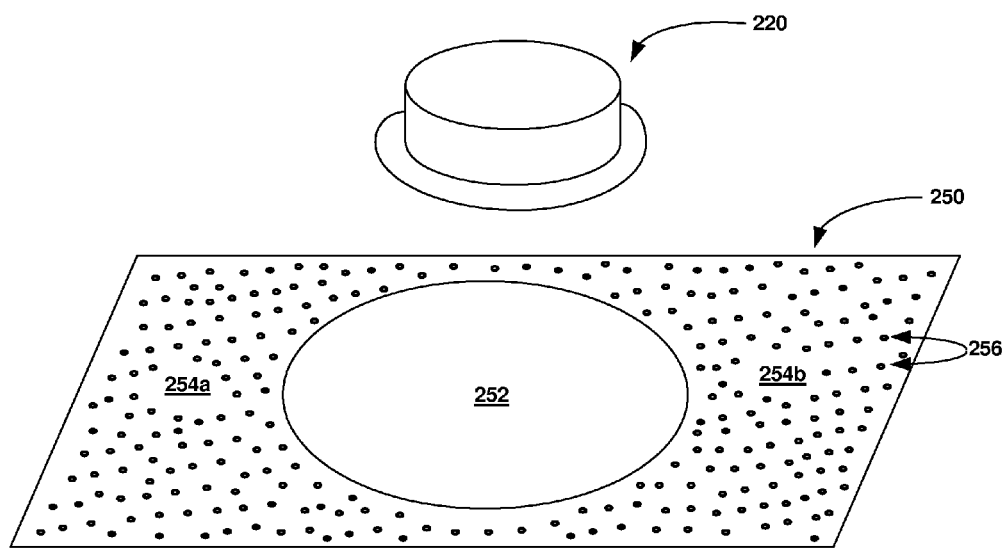
FIG. 6B is a perspective view of a mixing box in relation to a secondary deflector plate of a secondary feed distribution unit, according to an embodiment of the present invention.

FIG. 6B is a perspective view of a mixing box 220 in relation to a secondary deflector plate 250 of a secondary feed distribution unit 200, according to an embodiment of the present invention. Collection tray 240 is omitted from FIG. 6B for the sake of clarity of illustration. Secondary deflector plate 250 may be disposed beneath mixing box 220. Secondary deflector plate 250 may include a first peripheral portion 254a, a second peripheral portion 254b, and a central entire portion 252. Each of first peripheral portion 254a and second peripheral portion 254b may have a plurality of perforations 256 therethrough. In contrast, central entire portion 252 may at least substantially lack perforations, holes or voids therein. Secondary deflector plate 250 may be configured for the passage of liquid through perforations 256.

Figure 6C:
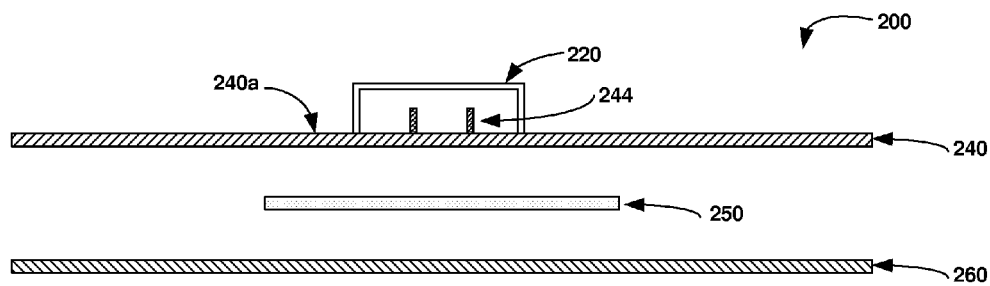
FIG. 6C is a schematic side view of a secondary feed distribution unit including a secondary deflector plate, according to an embodiment of the present invention.

FIG. 6C is a schematic side view of a secondary feed distribution unit 200, according to an embodiment of the present invention. Secondary feed distribution unit 200 may include a collection tray 240 having an upper surface 240a, a mixing box 220 disposed on upper surface 240a, a secondary deflector plate 250 disposed beneath collection tray 240, and a nozzle tray 260 disposed beneath secondary deflector plate 250. Secondary feed distribution unit 200 may further include a riser 244. Riser 244 may be at least substantially cylindrical and affixed to upper surface 240a of collection tray 240. Riser 244 may extend at least substantially orthogonal to collection tray 240.

Figure 6D:
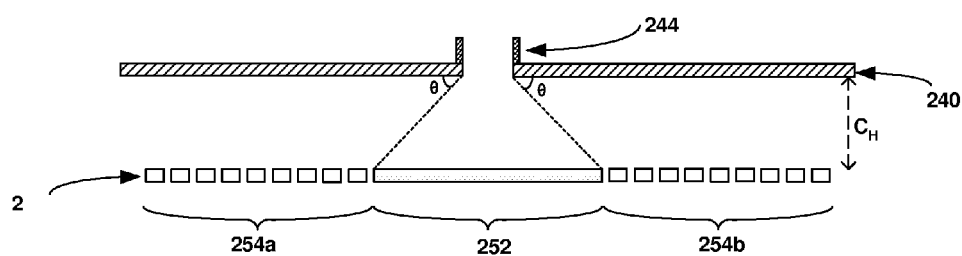
FIG. 6D is a schematic sectional side view of a secondary deflector plate in relation to a riser on a collection tray, according to an embodiment of the present invention.

FIG. 6D is a schematic sectional side view of a secondary deflector plate 250 in relation to a riser 244 on a collection tray 240, according to an embodiment of the present invention. Secondary deflector plate 250 comprises central entire portion 252 having an entire surface and lacking any perforations, holes, or voids therein. Central entire portion 252 may be disposed between first and second peripheral portions 254a, 254b of secondary deflector plate 250. In an embodiment, central entire portion 252 may occupy an area greater than a cross-sectional area of riser 244. In a sub-embodiment, the area of central entire portion 252 may be delineated by the base of a frusto-conical volume defined by a straight line extending at an angle, θ from collection tray 240 at the location of the inner wall of riser 244 to secondary deflector plate 250. Typically, θ may be in the range from about 20° to 70°, usually from about 30° to 60°, and often from about 40° to 50°. The vertical clearance, $C_H$ between secondary deflector plate 250 and collection tray 240 may be typically in the range from about 25% to 50% of the diameter of riser 244. In another sub-embodiment, central entire portion 252 may occupy an area about twice (2×) to five times (5×) the cross-sectional area of riser 244.

FIG. 7A is a schematic plan view of a mixing box 220, and FIG. 7B is a schematic plan view of the separated halves of mixing box 220 of FIG. 7A, according to an embodiment of the present invention. Mixing box 220 may comprise a first half 220a and a second half 220b. First and second mixing box halves 220a, 220b may each include a coupling flange 222 for joining or coupling first and second halves 220a, 220b together. In an embodiment, first and second halves 220a, 220b may be reversibly affixed to each other at their coupling flanges 222 via a plurality of pins, such as wedge pins (not shown).

FIG. 7C is a perspective view of one half of a mixing box 220 disposed on a collection tray segment 242, according to another embodiment of the present invention. A riser 244 may be disposed on collection tray segment 242 beneath mixing box 220. Riser 244 may be disposed above secondary deflector plate 250. Riser 244 may include at least one baffle (not shown) disposed on an inner surface of riser 244. Only one collection tray segment 242 is shown in FIG. 7C. In practice, a plurality of collection tray segments 242 jointly form collection tray 240.

Figure 8:
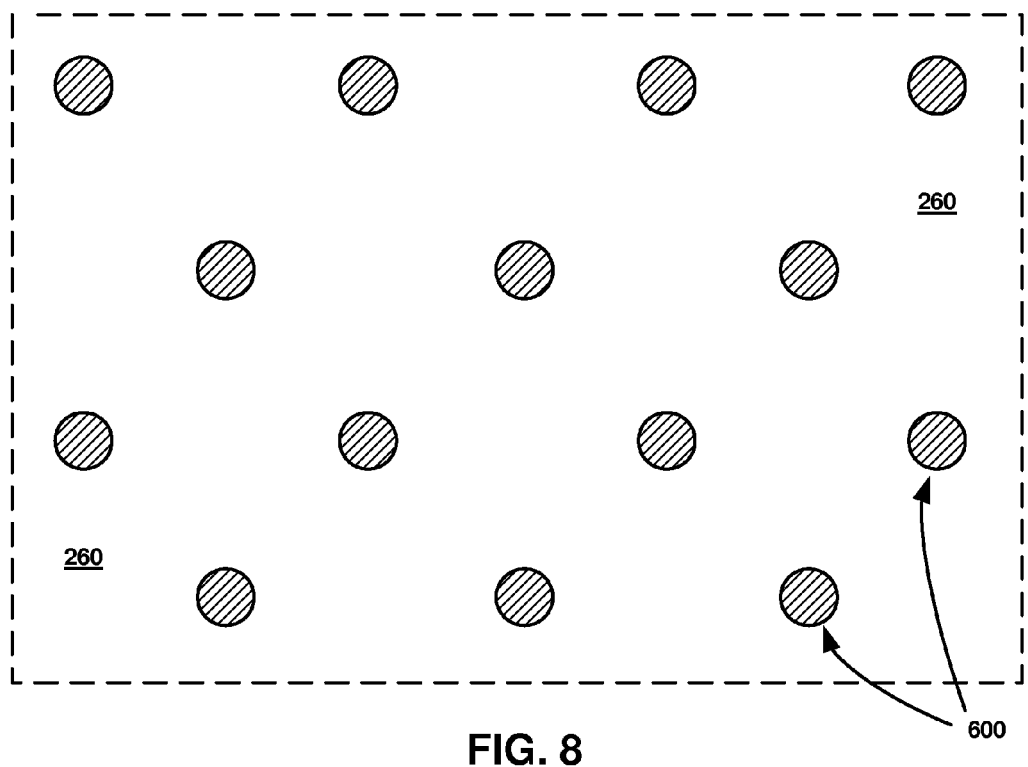
FIG. 8 is a schematic plan view of a portion of a nozzle tray showing an array of fluid distribution nozzles, according to an embodiment of the present invention.

FIG. 8 is a schematic plan view of a portion of a nozzle tray 260 including an array of fluid distribution nozzles 600, according to an embodiment of the present invention. Each nozzle 600 may be configured for the mixing and even distribution of fluid to a catalyst bed 402 disposed beneath nozzle tray 260. The array of nozzles 600 on nozzle tray 260 may have a triangular pitch with a nozzle spacing typically in the range from about 5 to 10 inches, and often in the range from about 6 to 8 inches. FIG. 8 represents only a portion of nozzle tray 260; in practice nozzle tray 260 may include many more nozzles 600.

With reference to FIGS. 9A-9C, FIG. 9A shows a fluid distribution nozzle 600 as seen from the side, according to an embodiment of the present invention. FIG. 9B is a longitudinal sectional view of nozzle 600 as seen along the lines 9B-9B of FIG. 9A. FIG. 9C shows liquid inlets 614 in nozzle 600 as seen along the lines 9C-9C of FIG. 9A. Nozzle 600 may comprise a nozzle body 602, a nozzle proximal end 600a, a nozzle distal end 600b, a plurality of gas inlets 612, and at least one liquid inlet 614. Nozzle proximal end 600a may be sealed with a nozzle cap 604. In an embodiment, cap 604 may be integral, e.g., cast, with nozzle body 602.

With reference to FIG. 9B, nozzle body 602 may comprise a proximal body portion 602a, an intermediate body portion 602b, and a distal body portion 602c.

Proximal body portion 602a defines a substantially cylindrical proximal void. Intermediate body portion 602b defines a substantially cylindrical intermediate void in fluid communication with the proximal void. Distal body portion 602c defines a substantially cylindrical distal void in fluid communication with the intermediate void. The proximal void may have a first diameter, the intermediate void may have a second diameter, and the distal void may have a third diameter. The first diameter may be substantially greater than the third diameter, and the third diameter may be substantially greater than the second diameter.

Each gas inlet 612 may be disposed laterally at proximal body portion 602a. Each gas inlet 612 may be configured for the passage of gas therethrough into proximal body portion 602a. Nozzle 600 may further comprise a gas nozzle 606. Gas nozzle 606 may be disposed substantially orthogonal to the walls of nozzle body 602 between proximal body portion 602a and distal body portion 602c to define intermediate body portion 602b. In an embodiment, gas nozzle 606 may be integral with nozzle body 602. In another embodiment, gas nozzle 606 may comprise a metal ring disposed within and affixed to nozzle body 602.

Each liquid inlet 614 may be disposed laterally at distal body portion 602c.

Each liquid inlet 614 may be configured for the passage of liquid therethrough. As can be seen, for example in FIG. 9C, each liquid inlet 614 may be disposed tangentially to an inner surface 616 of distal body portion 602c. In an embodiment, each liquid inlet 614 may be linear.

With further reference to FIG. 9C, each liquid inlet 614 may have a liquid inlet length, $I_L$, and a liquid inlet width, $I_W$. In an embodiment, a ratio ($I_L:I_W$) of liquid inlet length, $I_L$ to liquid inlet width, $I_W$ may be in the range from about 2:1 to 5:1. The liquid inlet length, $I_L$ shown in FIG. 9C may represent a minimum length of each liquid inlet 614, e.g., due to the tangential orientation of liquid inlets 614 with respect to nozzle body 602.

Each of liquid inlets 614 may be configured for forming a film of liquid on inner surface 616 of distal body portion 602c, and each of liquid inlets 614 may be configured for promoting the spiral flow of liquid on inner surface 616 of distal body portion 602c, wherein the flow of liquid is in a direction distal to liquid inlets 614.

Nozzle 600 may further comprise a converging first frusto-conical portion 608 in fluid communication with distal body portion 602c. Nozzle 600 may still further comprise a diverging second frusto-conical portion 610 distal to, and in fluid communication with, first frusto-conical portion 608. Nozzle 600 may still further comprise a plurality of indentations 620 located at distal end 600b of nozzle 600. Indentations 620 may be configured to further promote the dispersion of fluid emanating from nozzle distal end 600b as an evenly dispersed spray, e.g., having a conical spray pattern.

Figure 10:
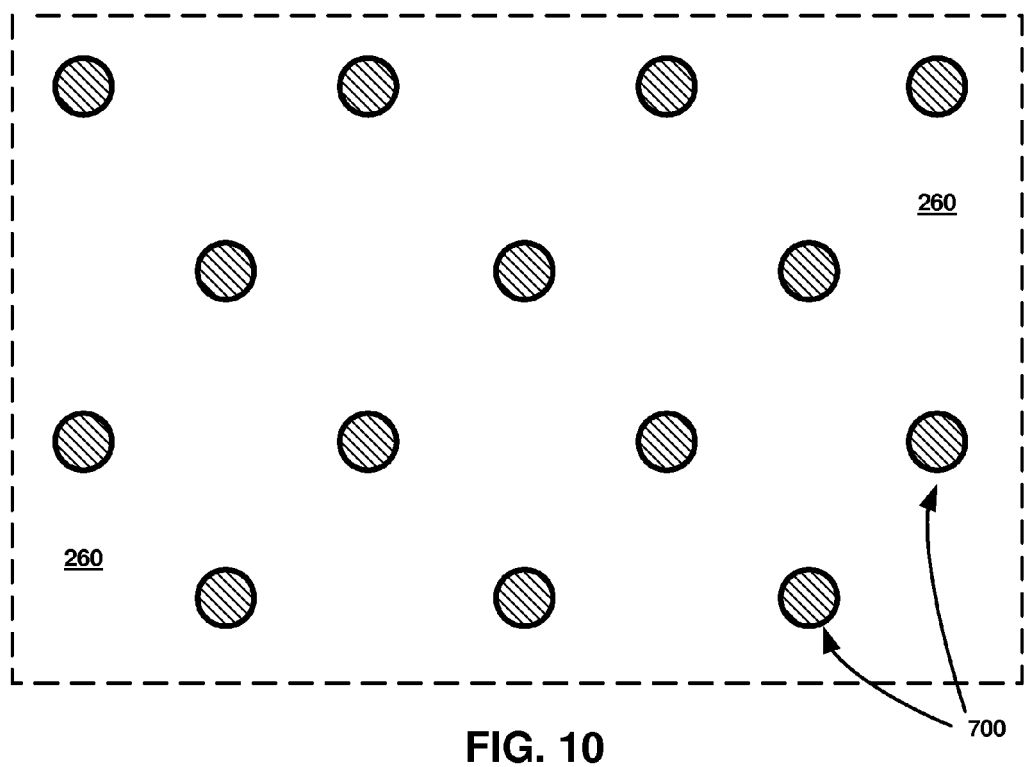
FIG. 10 is a schematic plan view of a portion of a nozzle tray showing an array of fluid distribution chimneys, according to an embodiment of the present invention.

FIG. 10 is a schematic plan view of a nozzle tray 260 including an array of fluid distribution chimneys 700, according to an embodiment of the present invention. Each chimney 700 may be fitted, e.g., retrofitted, with a fluid distribution nozzle 600' (see, for example, FIGS. 11A-D, and 12A-C) for the efficient mixing and even distribution of fluid to a catalyst bed 402 disposed beneath nozzle tray 260. The array of chimneys 700, and their associated nozzles 600', arranged on nozzle tray 260 may have a triangular pitch with a chimney 700/nozzle 600' spacing typically in the range from about 5 to 10 inches, and often in the range from about 6 to 8 inches. FIG. 10 represents only a portion of nozzle tray 260; in practice nozzle tray 260 may include many more chimneys 700.

Figure 11B:
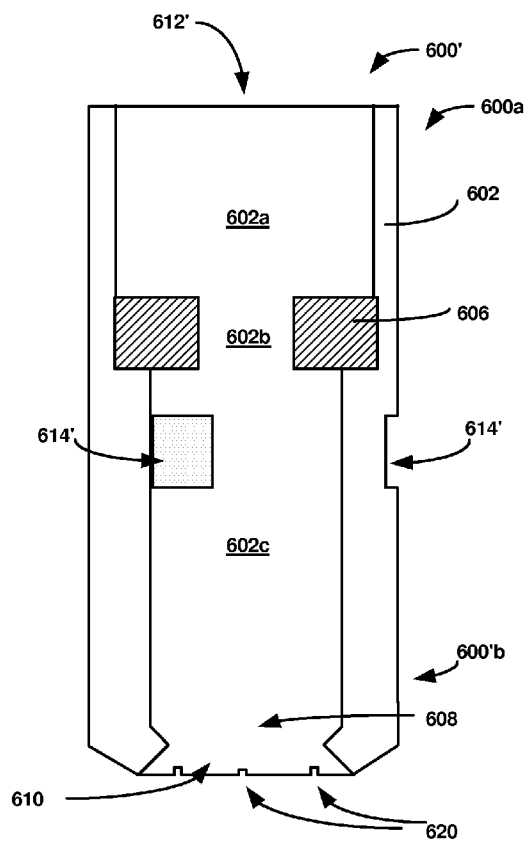
FIG. 11B is a longitudinal sectional view of the nozzle of FIG. 11A as seen along the lines 11B-11B.
Figure 11D:
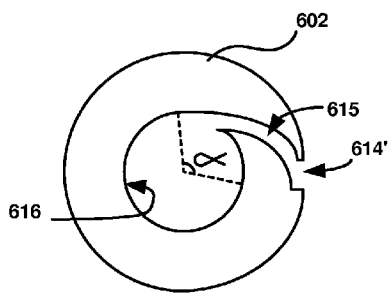
FIG. 11D shows a curved liquid inlet in the nozzle body along the lines 11D-11D of FIG. 11A, according to an embodiment of the present invention.
Figure 11C:
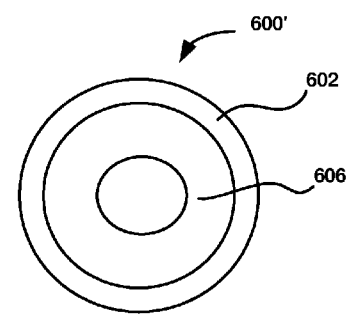
FIG. 11C is a plan view of the nozzle of FIG. 11A along the lines 11C-11C.

FIG. 11A shows a fluid distribution nozzle 600' as seen from the side, according to an embodiment of the present invention. FIG. 11B is a longitudinal sectional view of nozzle 600' of FIG. 11A as seen along the lines 11B-11B, FIG. 11C is a plan view of nozzle 600' of FIG. 11A along the lines 11B-11B. FIG. 11D shows a liquid inlet 614' in the nozzle body along the lines 11D-11D of FIG. 11A. Nozzle 600' may comprise a nozzle body 602, a nozzle proximal end 600'a, a nozzle distal end 600'b, a gas inlet 612', and at least one liquid inlet 614'. Nozzle 600' may be sized and configured for insertion in a fluid distribution chimney, for example chimney 700, during retrofitting an existing, conventional fluid distribution tray to provide a highly efficient nozzle tray for a hydroprocessing reactor, according to an embodiment of the instant invention (see, e.g., FIGS. 12A-C).

With reference to FIG. 11B, nozzle body 602 may comprise a proximal body portion 602a, an intermediate body portion 602b, and a distal body portion 602c.

Proximal body portion 602a defines a substantially cylindrical proximal void. Intermediate body portion 602b defines a substantially cylindrical intermediate void in fluid communication with the proximal void. Distal body portion 602c defines a substantially cylindrical distal void in fluid communication with the intermediate void. The proximal void may have a first diameter, the intermediate void may have a second diameter, and the distal void may have a third diameter. The first diameter may be substantially greater than the third diameter, and the third diameter may be substantially greater than the second diameter.

In an embodiment, gas inlet 612' may comprise a proximal axial opening in nozzle body 602. Gas inlet 612' may be configured for the passage of gas therethrough into proximal body portion 602a. Nozzle 600' may further comprise a gas nozzle 606. Gas nozzle 606 may be disposed substantially orthogonal to the walls of nozzle body 602 between proximal body portion 602a and distal body portion 602c to define intermediate body portion 602b. Nozzle 600' may further comprise a converging first frusto-conical portion 608 in fluid communication with distal body portion 602c. Nozzle 600 may further comprise a diverging second frusto-conical portion 610 distal to, and in fluid communication with, first frusto-conical portion 608.

FIG. 11C is a plan view of nozzle 600' of FIG. 11A, as seen along the lines 11C-11C, showing gas nozzle 606 within nozzle body 602. In an embodiment, gas nozzle 606 may be integral with the nozzle body. In another embodiment, gas nozzle 606 may comprise a metal ring disposed within and affixed to nozzle body 602. Gas nozzle 606 may be disposed concentrically with nozzle body 602.

FIG. 11D shows a liquid inlet 614' in nozzle body 602. Liquid inlet 614' may be disposed laterally at distal body portion 602c. Liquid inlet 614' may be configured for the passage of liquid therethrough into distal body portion 602c. In an embodiment, liquid inlet 614' may comprise a curved channel 615 disposed within the wall of nozzle body 602. As can be seen, for example in FIG. 11D, an inner terminus of curved channel 615 may be disposed tangentially to an inner surface 616 of distal body portion 602c. In an embodiment, curved channel 615 may subtend an angle, a in the range from about 60° to 180°, typically from about 70° to 170°, and often from about 80° to 160°. In an embodiment, curved channel 615 may have a substantially rectangular cross-sectional shape.

Liquid inlet 614' may be configured for forming a film of liquid on inner surface 616 of distal body portion 602c, and liquid inlet 614' may be configured for promoting the spiral flow of liquid on inner surface 616 of distal body portion 602c, wherein the flow of liquid is in a direction distal to liquid inlet 614'.

Nozzle 600' may still further comprise a plurality of indentations 620 located at distal end 600b of nozzle 600'. Indentations 620 may be configured to promote the dispersion of fluid emanating from nozzle distal end 600b as an evenly dispersed spray, e.g., having a conical spray pattern.

Figure 12A:
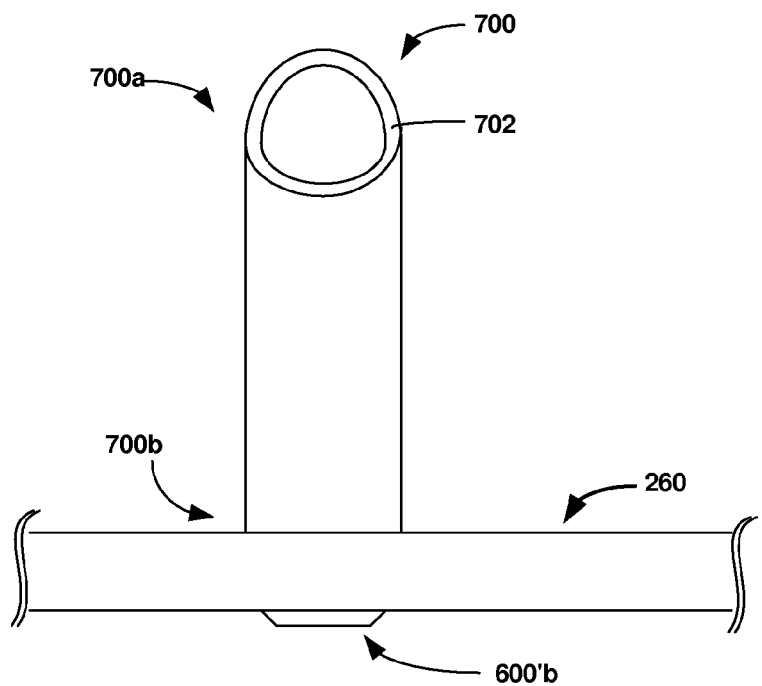
FIG. 12A is a front view of a fluid distribution chimney.
Figure 12B:
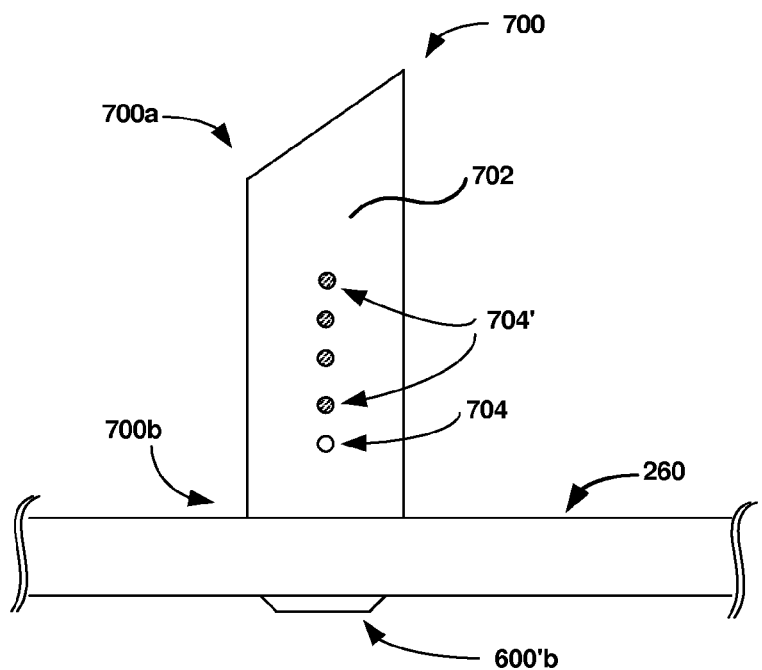
FIG. 12B is a side view of the chimney of FIG. 12A.
Figure 12C:
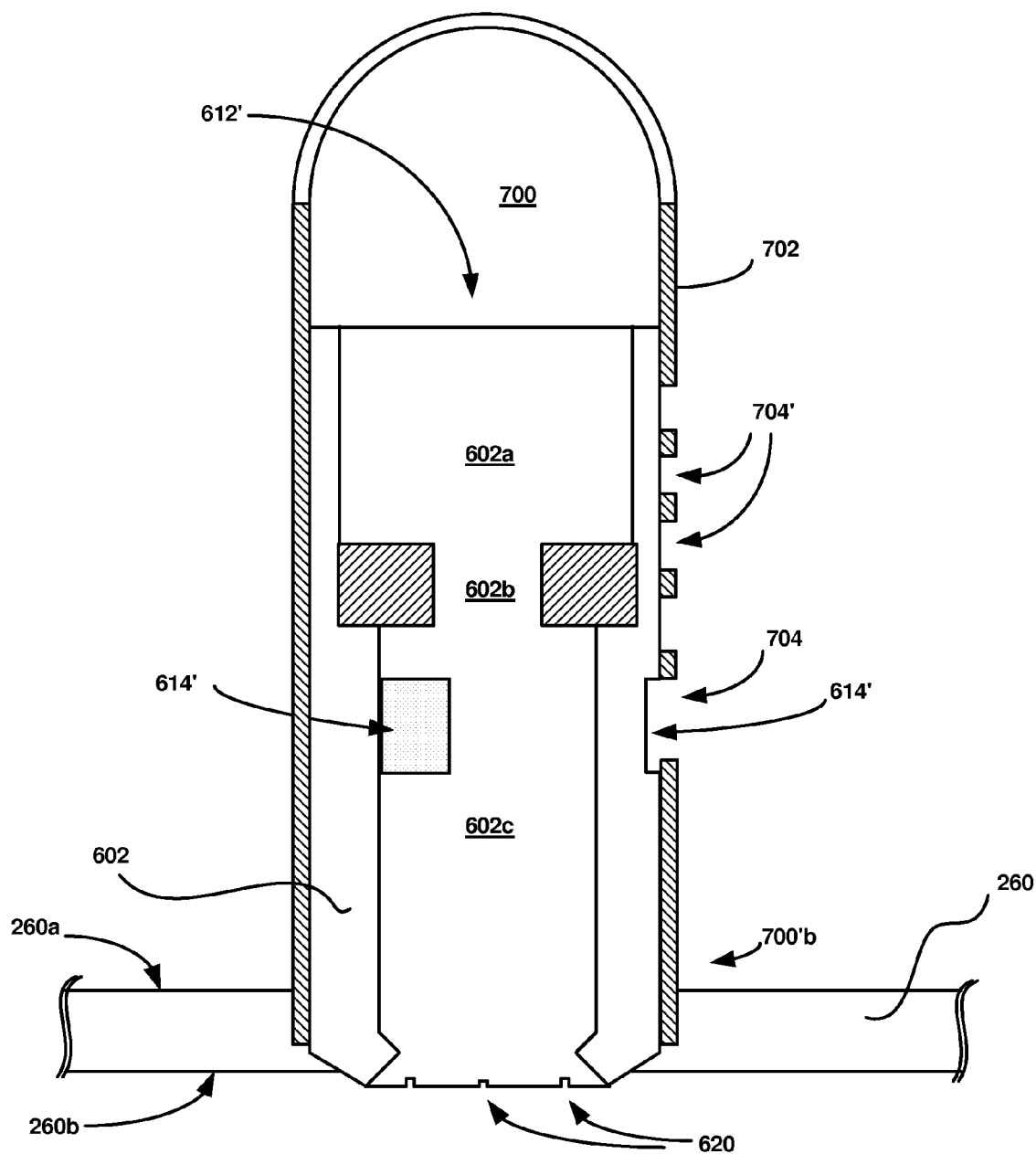
FIG. 12C is a longitudinal sectional view of the chimney of FIG.

FIG. 12A is a front view of a fluid distribution chimney 700, FIG. 12B is a side view of the chimney of FIG. 12A, and FIG. 12C is a longitudinal sectional view of the chimney of FIG. 12A with the nozzle of FIG. 11A inserted therein, according to another embodiment of the present invention. Chimney 700 may comprise a chimney wall 702, a chimney proximal end 700a, and a chimney distal end 700b. Chimney wall 702 may define a substantially cylindrical void therein. Chimney 700 may be affixed to a nozzle tray 260 at chimney distal end 700b. Chimney wall 702 may include a plurality of lateral holes 704/704' therein. In an embodiment, nozzle 600' may be inserted within chimney 700 such that nozzle distal end 600'b protrudes distally beyond a lower surface 260b of nozzle tray 260. Nozzle 600' may be configured for alignment of liquid inlet 614' with at least one lateral hole 704. When inserted in chimney 700, nozzle 600' may occlude and at least partially seal lateral holes 704'.

FIG. 12C is a longitudinal sectional view of chimney 700 having nozzle 600' (FIG. 11A) inserted therein. Chimney wall 702 may be affixed, e.g., welded, to nozzle tray 260, and nozzle 600' may be affixed, e.g., welded, to chimney wall 702. Features and elements of nozzle 600' are described hereinabove, for example, with reference to FIGS. 11A-D. Nozzle 600' when inserted within chimney wall 702 may serve to evenly mix and distribute fluids, e.g., a mixture of liquid feed and hydrogen gas, to a catalyst bed in a reactor for petroleum refinery hydroprocessing reactions.

FIG. 13 is a schematic longitudinal sectional view of a fluid distribution nozzle 800, according to another embodiment of the present invention. Nozzle 800 may comprise a substantially cylindrical hollow nozzle body 802 having a proximal portion 802a and a distal portion 802b, a cap 804 affixed to proximal portion 802a, a base 808 affixed to distal portion 802b, and a substantially cylindrical inner conduit 806 disposed axially within proximal portion 802a.

Cap 804 may have an axial proximal opening 805 therein, and inner conduit 806 may be disposed within proximal opening 805. Inner conduit 806 may extend proximally beyond cap 804 to define a proximal end 806a of inner conduit 806. Nozzle body 802 may have a plurality of outer slots 814 disposed circumferentially around nozzle body 802. A distal end 806b of inner conduit 806 may terminate distally at a location proximal to a distal end 814b of each of outer slots 814.

Each of cap 804 and base 808 may be at least substantially dome-shaped, wherein cap 804 tapers distally from narrow to broad, and base 808 tapers distally from broad to narrow. Each of cap 804 and base 808 may be threaded. Cap 804 may be sealingly engaged with nozzle body 802 via threads on proximal portion 802a. Base 808 may be sealingly engaged with nozzle body 802 via threads on distal portion 802b. Base 808 may have an axial distal opening 810 configured for the passage and distribution of fluid therethrough.

Inner conduit 806 may be sealingly engaged with cap 804 and disposed substantially concentrically with nozzle body 802. Nozzle body 802 and inner conduit 806 may jointly define a void within nozzle 800, wherein the void may comprise an annular proximal void 803a and a substantially cylindrical distal void 803b Inner conduit 806 may have a plurality of inner slots 812 disposed circumferentially around proximal end 806a. The configuration of inner slots 812 and outer slots 814 may be at least to some extent a matter of design choice for the skilled artisan.

Each of inner slots 812 may be in fluid communication with the void via inner conduit 806. Inner conduit 806 may be configured for the passage of gas therethrough from inner slots 812 to distal void 803b. Nozzle 800 may be configured for the passage of liquid through outer slots 814 to distal void 803b within nozzle body 802. Axial distal opening 810 may be frusto-conical and taper distally from narrow to broad. Nozzle 800 may be affixed to a nozzle tray 260, e.g., at distal portion 802b.

In an embodiment, fluid distribution nozzle 800 may provide an efficient fluid mixing and distribution nozzle for a nozzle tray of a reactor, wherein nozzle 800 may be easily and inexpensively assembled using off-the-shelf pipe parts. In an embodiment, components of nozzle 800, e.g., nozzle body 802, cap 804 and base 808, may be constructed from threaded, standard stainless steel pipe, e.g., having National Pipe Thread (NPT) threads according to ANSI/ASME standard B1.20.1.

FIG. 14A is a schematic cut-away side view showing a portion of a reactor 20, according to another embodiment of the present invention. Reactor 20 may house a primary feed distribution unit 200', a secondary feed distribution unit 200, and a catalyst support unit 400. Primary feed distribution unit 200' and secondary feed distribution unit 200 may each comprise elements, features, and characteristics as described hereinabove, e.g., with reference to FIGS. 4A-13.

Reactor 20 may comprise a reactor shell 30. At least a portion of reactor shell 30 may have substantially vertical shell walls 32. Each of catalyst support unit 400, primary feed distribution unit 200', and secondary feed distribution unit 200 may be disposed at least substantially horizontally and orthogonal to the walls of reactor shell 30. Only two catalyst support units 400, one primary feed distribution unit 200', and one secondary feed distribution unit 200 are shown in FIG. 14A. In an embodiment, reactor 20 may house a plurality of secondary feed distribution units 200. Each secondary feed distribution unit 200 may have a corresponding catalyst support unit 400 for supporting a catalyst bed 402 disposed beneath each secondary feed distribution unit 200 (see, for example, FIG. 5A). Each catalyst support unit 400 may comprise a plurality of catalyst support beams 406, a plurality of screen panels 408, and a plurality of grid panels 410. Catalyst beds 402 are omitted from FIGS. 14A-F for the sake of clarity of illustration.

FIG. 14B is a plan view of reactor shell 30, as seen along the lines 14B-14B of FIG. 14A, and shows components of catalyst support unit 400 including a plurality of catalyst support beams 406 and a plurality of screen panels 408. Each of catalyst support beams 406 may span reactor shell 30. Screen panels 408 may jointly define a catalyst screen which may occupy at least substantially 100% of the cross-sectional area of reactor shell 30. With further reference to FIG. 14B, one screen panel 408 is shown as being displaced to reveal a grid panel 410.

FIG. 14C is a plan view of the catalyst support unit 400 of FIG. 14B with all screen panels 408 removed and showing a plurality of grid panels 410. Grid panels 410 may be supported by catalyst support beams 406. Screen panels 408 may in turn be supported by grid panels 410. Peripherally located grid panels 410 having an arcuate outer edge may be jointly supported by catalyst support beam 406 and a circumferential shell ledge 404. Each catalyst support beam 406 may comprise a pair of lateral support bars 414 (see, for example, FIG. 14E). Three grid panels are shown in FIG. 14C as being removed to reveal portions of shell ledge 404 and support bars 414.

With further reference to FIGS. 14B and 14C, it is to be understood that catalyst support unit 400 is not limited to the configuration of grid panels 410 and screen panels 408 as shown in FIGS. 14B and 14C, but rather other numbers and configurations of both grid panels 410 and screen panels 408 are also within the scope of the present invention. In an embodiment, components of catalyst support unit 400 may be readily assembled and disassembled. In a sub-embodiment, components of catalyst support unit 400 may be affixed to each other via a plurality of pins, e.g., wedge pins (not shown).

FIG. 14D is a plan view of a portion of catalyst support unit 400 with both screen panels 408 and grid panels 410 removed to more fully reveal catalyst support beams 406 and shell ledge 404. In an embodiment, shell ledge 404 may comprise weld build-up material on an inner surface 32a of shell walls 32. Although FIG. 14D shows two catalyst support beams 406, the invention is by no means limited to two such beams per catalyst support unit 400. In an embodiment, each catalyst support unit 400 may typically comprise from about two (2) to six (6) catalyst support beams 406.

FIG. 14E is a sectional view showing the catalyst support beams 406, grid panels 410, and screen panels 408, as seen along the lines 14E-14E of FIG. 14B; and FIG. 14F is a sectional view showing a catalyst support beam 406 in relation to the reactor shell wall 32 and shell ledge 404, as seen along the lines 14F-14F of FIG. 14D. As noted hereinabove, catalyst support beams 406 may each comprise a pair of lateral support bars 414. Support bars 414 may be configured for supporting at least a portion of each grid panel 410. The plurality of grid panel 410 may in turn jointly support the plurality of screen panels 408. The plurality of screen panels 408 may jointly form a screen configured for spanning substantially the entire cross-sectional area of reactor shell 30, and the plurality of screen panels 408 may be jointly configured for supporting a catalyst bed 402 (see, e.g., FIG. 5A). Each catalyst bed 402 may comprise a layer of particulate solid catalyst, as is well known to the skilled artisan.

Numerous variations of the present invention may be possible in light of the teachings and examples herein. It is therefore understood that within the scope of the following claims, the invention may be practiced otherwise than as specifically described or exemplified herein.

What is claimed is:

1. A reactor system, comprising:
   (a) a reactor shell;
   (b) a primary feed distribution unit disposed within the reactor shell; and
   (c) at least one secondary feed distribution unit disposed beneath the primary feed distribution unit within the reactor shell, wherein:
   (d) the primary feed distribution unit comprises a primary deflector plate and a first nozzle tray disposed beneath the deflector plate; and
   (e) the at least one secondary feed distribution unit comprises a collection tray and a second nozzle tray disposed beneath the collection tray, wherein each of the first nozzle tray and the second nozzle tray comprises a plurality of nozzles, the nozzles each comprising a nozzle body including a distal body portion having at least one liquid inlet configured for the passage of liquid therethrough, the distal body portion defining a substantially cylindrical distal void, wherein each liquid inlet is disposed tangentially to an inner surface of the distal body portion.

2. The reactor system according to claim 1, wherein:
   (a) the primary deflector plate is disposed at least substantially orthogonal to the reactor shell wall, and
   (b) the primary deflector plate has an area in the range from about 70% to 100% of the cross-sectional area of the reactor shell.

3. The reactor system according to claim 1, wherein the primary deflector plate is at least substantially circular.

4. The reactor system according to claim 1, wherein:
   (a) the at least one secondary feed distribution unit further comprises a secondary deflector plate disposed between the collection tray and the second nozzle tray,
   (b) the secondary deflector plate is disposed at least substantially orthogonal to the reactor shell wall, and (c) the secondary deflector plate having an area in the range from about 5% to 50% of the cross-sectional area of the reactor shell.

5. The reactor system according to claim 4, wherein: the secondary deflector plate is at least substantially rectangular and having a plurality of perforations therethrough.

6. The reactor system according to claim 4, further comprising a substantially cylindrical riser affixed to an upper surface of the collection tray and extending at least substantially orthogonal to the collection tray, and wherein the secondary deflector plate comprises a central entire portion having an area greater than a cross-sectional area of the riser.

7. The reactor system according to claim 1, wherein the collection tray comprises a plurality of collection tray segments.

8. The reactor system according to claim 1, wherein each of the first nozzle tray and the second nozzle tray comprises a plurality of nozzle tray segments.

9. The reactor system according to claim 1, wherein each at least one secondary feed distribution unit further comprises a mixing box disposed on the collection tray, wherein the mixing box is substantially a two-piece construction.

10. The reactor system according to claim 1, wherein the mixing box comprises a first mixing box half and a second mixing box half, and the mixing box is configured for reversibly coupling the first mixing box half to the second mixing box half via a coupling flange on each of the first mixing box half and the second mixing box half.

11. The reactor system according to claim 1, wherein the distal body portion has a plurality of the liquid inlets, and each of the liquid inlets is linear.

12. The reactor system according to claim 1, wherein:
(a) at least one of the first nozzle tray and the second nozzle tray comprises a plurality of chimneys, each chimney having a chimney insert disposed therein, wherein:
(b) each chimney insert comprises one of the nozzles, the nozzle body having a body wall, and
(c) each liquid inlet comprises a curved channel disposed within the wall of the distal body portion.

13. A reactor system, comprising:
(a) a reactor shell having an inner wall;
(b) a primary feed distribution unit disposed within the reactor shell; and
(c) at least one secondary feed distribution unit disposed beneath the primary feed distribution unit within the reactor shell, each secondary feed distribution unit comprising:
(d) a collection tray,
(e) a nozzle tray disposed beneath the collection tray;
(f) at least one support ring affixed to the reactor shell inner wall, and
(g) a plurality of trusses, each truss spanning the at least one support ring; each truss having an upper flange and a lower flange, the upper flange supporting the collection tray and the lower flange supporting the nozzle tray.

14. The reactor system of claim 13, wherein the collection tray comprises a plurality of collection tray segments.

15. The reactor system of claim 14, wherein the nozzle tray comprises a plurality of nozzle tray segments.

16. The reactor system of claim 13, further comprising:
(a) a catalyst support unit disposed within the reactor shell; and
(b) a shell ledge disposed circumferentially on the reactor shell inner wall, the catalyst support unit comprising:
(c) a plurality of catalyst support beams supported on the shell ledge, wherein each of the catalyst support beams is disposed horizontally and configured to span the reactor shell,
(d) a plurality of grid panels supported on the plurality of catalyst support beams, and
(e) a plurality of screen panels supported on the plurality of grid panels; and wherein the plurality of screen panels are configured for jointly supporting a catalyst bed.

17. The reactor system of claim 13, wherein the nozzle tray includes an array of fluid distribution nozzles, each nozzle having a nozzle body and at least one liquid inlet disposed tangentially to an inner surface of the nozzle body.

18. A feed distribution unit for a catalytic reactor, comprising:
(a) a deflector plate; and
(b) a nozzle tray disposed beneath the deflector plate, wherein the nozzle tray includes a plurality of nozzles, the nozzles each comprise a nozzle body including a distal body portion having at least one liquid inlet configured for the passage of liquid therethrough, the distal body portion defining a substantially cylindrical distal void, wherein each liquid inlet is disposed tangentially to an inner surface of the distal body portion.

19. The feed distribution unit according to claim 18, wherein:
(a) the feed distribution unit comprises a secondary feed distribution unit,
(b) the deflector plate comprises a secondary deflector plate having a central entire portion, and
(c) the secondary feed distribution unit further comprises a collection tray and a mixing box disposed on an upper surface of the collection tray, wherein the mixing box is of two-piece construction.

20. The feed distribution unit according to claim 18, wherein the plurality of nozzles are disposed on each of the first nozzle tray and the second nozzle tray as a nozzle array having a triangular pitch with a nozzle spacing in the range from about 5 to 10 inches.

* * * * *